US012587254B2

(12) United States Patent
    Takano

(10) Patent No.:  US 12,587,254 B2
(45) Date of Patent:      Mar. 24, 2026

(54) METHOD AND DEVICE FOR PERFORMING REPETITION TRANSMISSION TO IMPROVE UPLINK QUALITY

(71) Applicant: SONY GROUP CORPORATION, Tokyo (JP)

(72) Inventor: Hiroaki Takano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 307 days.

(21) Appl. No.: 18/246,345

(22) PCT Filed: Sep. 14, 2021

(86) PCT No.: PCT/JP2021/033623
    § 371 (c)(1),
    (2) Date: Mar. 23, 2023

(87) PCT Pub. No.: WO2022/080060
    PCT Pub. Date: Apr. 21, 2022

(65) Prior Publication Data
    US 2023/0370145 A1      Nov. 16, 2023

(30) Foreign Application Priority Data
    Oct. 15, 2020    (JP) ................................. 2020-174278

(51) Int. Cl.
    *H04B 7/06*       (2006.01)
    *H04L 1/08*       (2006.01)
    *H04W 72/044*     (2023.01)

(52) U.S. Cl.
    CPC ............. *H04B 7/0695* (2013.01); *H04L 1/08* (2013.01); *H04W 72/046* (2013.01)

(58) Field of Classification Search
    CPC .. H04B 7/0695; H04B 7/088; H04B 7/06952; H04B 7/0628; H04L 1/08; H04L 1/1858; H04L 1/189; H04W 72/046; H04W 16/28
    See application file for complete search history.

(56) References Cited

U.S. PATENT DOCUMENTS

| | | | |
|---|---|---|---|
| 2019/0319823 A1* | 10/2019 | Akkarakaran | ........ H04W 76/27 |
| 2020/0205150 A1* | 6/2020 | Cheng | ................... H04W 72/21 |
| 2021/0007138 A1* | 1/2021 | Xu | ....................... H04L 27/2607 |
| 2021/0352503 A1* | 11/2021 | Zhou | ..................... H04W 16/28 |
| 2021/0352705 A1* | 11/2021 | Kang | ................ H04W 72/1273 |
| 2021/0360616 A1* | 11/2021 | Yi | ......................... H04L 5/0012 |
| 2021/0376894 A1* | 12/2021 | Cha | ........................ H04B 7/088 |
| 2022/0022141 A1* | 1/2022 | Cirik | ..................... H04L 5/0051 |

OTHER PUBLICATIONS

International Search Report and Written Opinion of PCT Application No. PCT/JP2021/033623, issued on Dec. 14, 2021, 09 pages of ISRWO.

(Continued)

*Primary Examiner* — Mewale A Ambaye
(74) *Attorney, Agent, or Firm* — CHIP LAW GROUP

(57) ABSTRACT

A base station device transmits, to a terminal device, repetition information instructing repetition transmission of a signal in an uplink and beam information instructing a beam to be used for the repetition transmission in association with each other.

19 Claims, 19 Drawing Sheets

Terminal                                                    Base station

BEAM SWEEPING TRANSMISSION OF MEASUREMENT SIGNAL FOR BEAM SELECTION                S11

REPORT BEAM MEASUREMENT RESULT                              S12

TRANSMIT MEASUREMENT SIGNAL FOR CHANNEL QUALITY ACQUISITION                          S13

REPORT CHANNEL QUALITY                                      S14

TRANSMIT USER DATA                                          S15

(56)  References Cited

OTHER PUBLICATIONS

"Enhancements on Multi-TRP for PDCCH, PUCCH and PUSCH", Qualcomm Incorporated, 3GPP TSG-RAN WG1, 102-e Meeting, R1-2006791, Aug. 17-28, 2020, 14 pages.

"Discussion on enhancement on PDCCH, PUCCH, PUSCH in MTRP scenario", Vivo, 3GPP TSG RAN WG1, 102-e Meeting, R1-2005364, Aug. 17-28, 2020, 12 pages.

"Considerations on Multi-TRP for PDCCH, PUCCH, PUSCH", Sony, 3GPP TSG RAN WG1, 102-e Meeting, R1-2005561, Aug. 17-28, 2020, 04 pages.

"Discussion on potential techniques for PUSCH coverage enhancement", WILUS Inc, 3GPP TSG RAN WG1, 102-e Meeting, R1-2006892, Aug. 17-28, 2020, 04 pages.

"Summary of AI:8.1.2.1 Enhancements for Multi-TRP URLLC for PUCCH and PUSCH", Moderator (Nokia, Nokia Shanghai Bell), 3GPP TSG RAN WG1, 102-e Meeting, R1-2007182, Aug. 17-28, 2020, 39 pages.

"Considerations on Multi-TRP for PDCCH, PUCCH, PUSCH", Sony, 3GPP TSG RAN WG1, 103-e Meeting, R1-2008347, Oct. 26-Nov. 28, 2020, 05 pages.

* cited by examiner

CSI-RS resource 1

CSI-RS resource 2

RX Beam #1

RX Beam #2

200

TX Beam #1

TX Beam #2

200

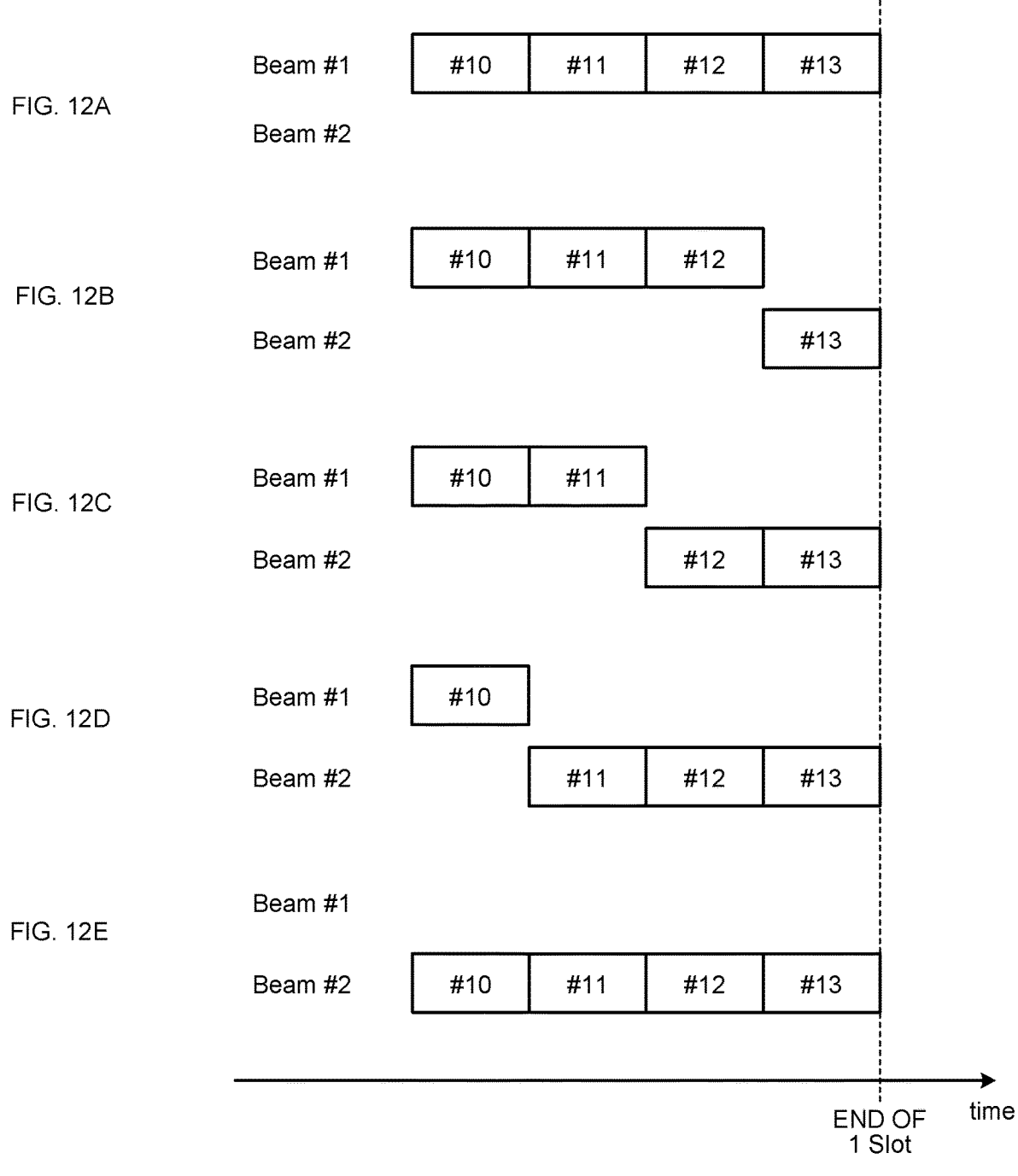

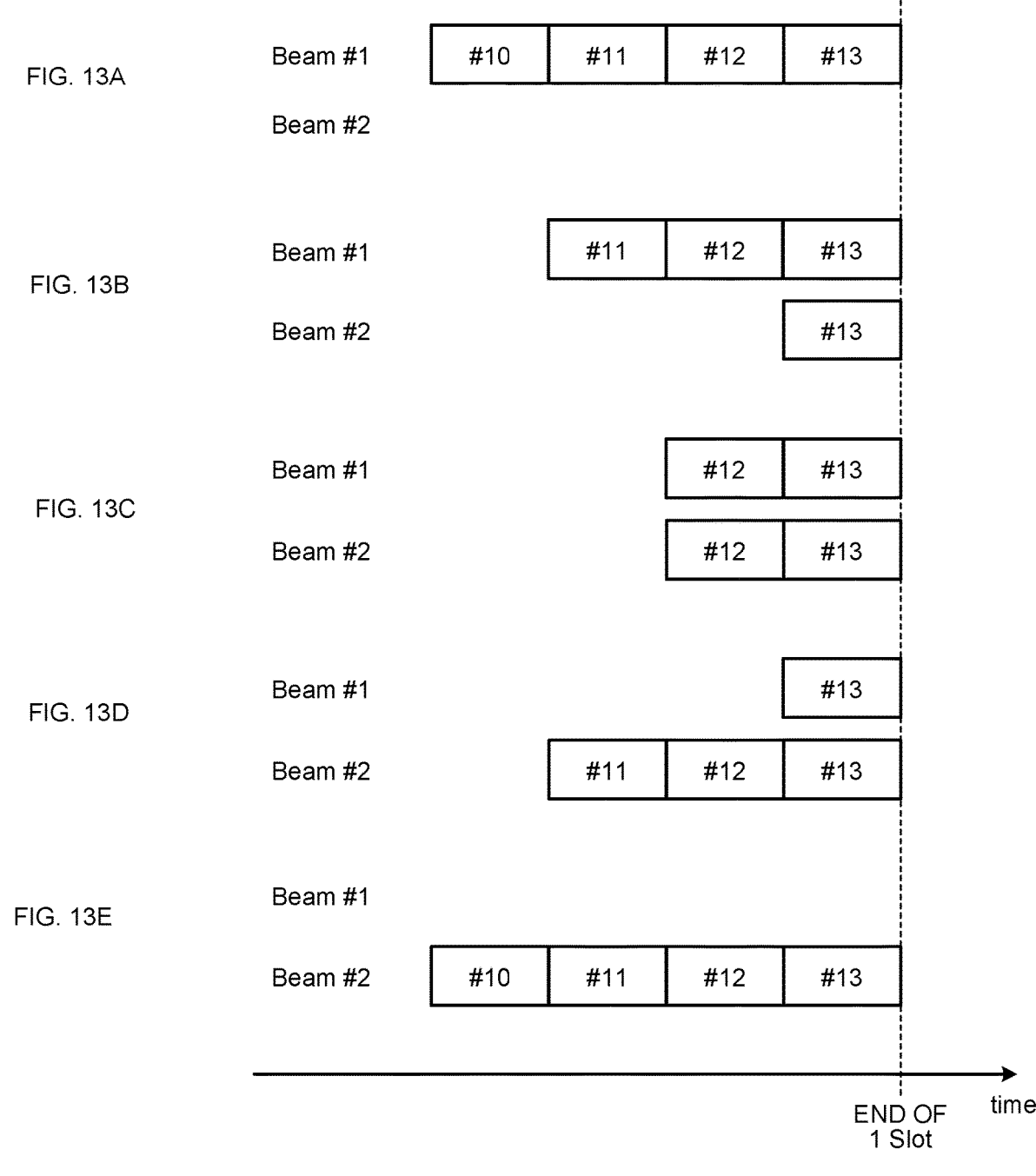

| SIMULTANEOUS TRANSMISSION OF DIFFERENT BEAMS | 0:NONE |
|---|---|
| RATIO OF NUMBER OF REPETITIONS OF BEAMS #1 AND #2 for 1 slot | (NUMBER OF REPETITIONS PERFORMED IN Beam #1 AND NUMBER OF REPETITIONS PERFORMED IN Beam #2) |
| RATIO OF NUMBER OF REPETITIONS OF BEAMS #1 AND #2 for 2 slot | USE SAME SETTING AS FIRST SLOT ABOVE |

FIG.16

| PATTERN | FIRST SLOT | SECOND SLOT |
|---------|------------|-------------|
| #1 | (4,0) | (4,0) |
| #2 | (3,1) | (3,1) |
| #3 | (2,2) | (2,2) |
| #4 | (1,3) | (1,3) |
| #5 | (0,4) | (0,4) |

FIG.17

| SIMULTANEOUS TRANSMISSION OF DIFFERENT BEAMS | 0:NONE |
|----------------------------------------------|--------|
| RATIO OF NUMBER OF REPETITIONS OF BEAMS #1 AND #2 for 1 slot | (NUMBER OF REPETITIONS PERFORMED IN Beam #1 AND NUMBER OF REPETITIONS PERFORMED IN Beam #2) |
| RATIO OF NUMBER OF REPETITIONS OF BEAMS #1 AND #2 for 2 slot | SETTING UNIQUELY DERIVED FROM FIRST SLOT |

FIG.18

| PATTERN | FIRST SLOT | SECOND SLOT |
|---------|-----------|-------------|
| #1 | (4,0) | (0,4) |
| #2 | (3,1) | (1,3) |
| #3 | (2,2) | (2,3) |
| #4 | (1,3) | (3,1) |
| #5 | (0,4) | (4,0) |

FIG.19

| SIMULTANEOUS TRANSMISSION OF DIFFERENT BEAMS | 0:NONE |
|---------------------------------------------|--------|
| RATIO OF NUMBER OF REPETITIONS OF BEAMS #1 AND #2 for 1 slot | (NUMBER OF REPETITIONS PERFORMED IN Beam #1 AND NUMBER OF REPETITIONS PERFORMED IN Beam #2) |
| RATIO OF NUMBER OF REPETITIONS OF BEAMS #1 AND #2 for 2 slot | (NUMBER OF REPETITIONS PERFORMED IN Beam #1 AND NUMBER OF REPETITIONS PERFORMED IN Beam #2) |

FIG.20

| PATTERN | FIRST SLOT | SECOND SLOT |
|---------|-----------|-------------|
| #1 | (4,0) | (1,3) |
| #2 | (3,1) | (2,2) |
| #3 | (2,2) | (4,0) |
| #4 | (1,3) | (2,2) |
| #5 | (0,4) | (4,0) |

FIG.21

| Uplink OFDM Symbol IN 1 slot | STATE OF Repetition OF PUSCH IN 1 slot |
|------------------------------|----------------------------------------|
| 0 | 0 |
| 1 | 1(NO REPETITION) |
| 2 | 2(NO REPETITION) |
| 3 | 3(NO REPETITION) |
| 4 | 4(NO REPETITION) |
| 5 | 5(NO REPETITION) |
| 6 | 6(NO REPETITION) |
| 7 | 7(NO REPETITION) |
| 8 | 4+4 |
| 9 | 5+4 |
| 10 | 5+5 |
| 11 | 6+5 |
| 12 | 6+6 |
| 13 | 7+6 |
| 14 | 7+7 |

FIG.22

| Beam USED IN FIRST Part | CSI-RS resource ID 1 |
|---|---|
| Beam USED IN SECOND Part | CSI-RS resource ID 2 |

FIG.23

| Beam USED IN FIRST Part | CSI-RS resource ID 1 |
|---|---|
| Beam USED IN SECOND Part | CSI-RS resource ID 1 |

| UPLINK OFDM SYMBOL IN ONE SLOT | STATE OF REPETITION OF PUSCH IN ONE SLOT |
| --- | --- |
| 0 | 0 |
| 1 | 1(NO REPETITION) |
| 2 | 1+1 |
| 3 | 2+1 |
| 4 | 2+2 |
| 5 | 3+2 |
| 6 | 3+3 |
| 7 | 4+3 |
| 8 | 3+3+2 |
| 9 | 3+3+3 |
| 10 | 4+3+3 |
| 11 | 4+4+3 |
| 12 | 4+4+4 |
| 13 | 5+4+4 |
| 14 | 5+5+4 |

FIG.26

| BEAM USED IN FIRST PART | CSI-RS resource ID 1 |
| --- | --- |
| BEAM USED IN SECOND PART | CSI-RS resource ID 2 |
| BEAM USED IN THIRD PART | CSI-RS resource ID 3 |

FIG.27

| | |
|---|---|
| BEAM USED IN FIRST PART | CSI-RS resource ID 1 |
| BEAM USED IN SECOND PART | CSI-RS resource ID 1 |
| BEAM USED IN THIRD PART | CSI-RS resource ID 2 |

1

METHOD AND DEVICE FOR PERFORMING REPETITION TRANSMISSION TO IMPROVE UPLINK QUALITY

CROSS REFERENCE TO RELATED APPLICATIONS

This application is a U.S. National Phase of International Patent Application No. PCT/JP2021/033623 filed on Sep. 14, 2021, which claims priority benefit of Japanese Patent Application No. JP 2020-174278 filed in the Japan Patent Office on Oct. 15, 2020. Each of the above-referenced applications is hereby incorporated herein by reference in its entirety.

FIELD

The present disclosure relates to a base station device, a terminal device, a communication system, and a communication method.

BACKGROUND

Various radio access schemes and radio networks in cellular mobile communications (hereinafter, "Long Term Evolution (LTE)", "LTE-Advanced (LTE-A)", "LTE-Advanced Pro (LTE-A Pro)", "Fifth Generation (5G)", "New Radio (NR)", "New Radio Access Technology (NRAT)", "Evolved Universal Terrestrial Radio Access (EUTRA)", or "Further EUTRA (FEUTRA)") are under examination in Third Generation Partnership Project (3GPP). In the following description, LTE includes LTE-A, LTE-A Pro, and EUTRA, and NR includes NRAT and FEUTRA. In LTE and NR, a base station device (base station) is also referred to as an evolved NodeB (eNodeB) in LTE and a gNodeB in NR, while a terminal device (mobile station, mobile station device, or terminal) is also referred to as user equipment (UE). LTE and NR are cellular communication systems that arranges a plurality of areas covered by the base station, as cellular areas. A single base station may manage a plurality of cells.

For example, Non Patent Literature 1 discloses repetition transmission of a signal in the uplink.

CITATION LIST

Non Patent Literature

Non Patent Literature 1: vivo, Discussion on enhancement on PDCCH, PUCCH, PUSCH in MTRP scenario [online], 3GPP TSG RAN WG1 #102-e R1-2005364, Aug. 8, 2020, pp. 1-12, [searched: 2020.10.9], Internet <URL: https://www.3gpp.org/ftp/TSG_RAN/WG1_RL1/ TSGR1_102-e/Docs/R1-2005364.zip>

SUMMARY

Technical Problems

For example, in NR use cases in which a live video or the like is transmitted to a broadcasting station in an uplink and broadcast from a broadcasting station to a viewer, there is a demand for improvement in quality and reliability in uplink as well as downlink.

One of methods for improving communication quality and reliability is a repetition transmission technology. An uplink is also required to have a mechanism for performing repetition transmission in order to improve communication quality and reliability.

In view of this, the present disclosure provides a mechanism capable of performing repetition transmission to improve uplink quality.

Note that the above problem or target is merely one of a plurality of problems or targets that can be solved or achieved by a plurality of embodiments disclosed in the present specification.

Solution to Problem

According to the present disclosure, a base station device is provided. The base station device transmits, to a terminal device, repetition information instructing repetition transmission of a signal in an uplink and beam information instructing a beam to be used for the repetition transmission in association with each other.

BRIEF DESCRIPTION OF DRAWINGS

FIGS. 12A, 12B, 120, 12D, and 12E are diagrams illustrating an arrangement example of control signals in repetition transmission according to the embodiment of the present disclosure.

FIGS. 13A, 13B, 13C, 13D, and 13E are diagrams illustrating an arrangement example of control signals in repetition transmission according to the embodiment of the present disclosure.

FIG. 16 is a diagram illustrating an example of a pattern of repetition transmission according to the embodiment of the present disclosure.

FIG. 17 is a diagram illustrating another example of repetition setting information instructed by the base station device according to the embodiment of the present disclosure.

FIG. 18 is a diagram illustrating another example of the pattern of repetition transmission according to the embodiment of the present disclosure.

FIG. 19 is a diagram illustrating an example of repetition setting information instructed by the base station device according to the embodiment of the present disclosure.

FIG. 20 is a diagram illustrating an example of the pattern of repetition transmission according to the embodiment of the present disclosure.

FIG. 21 is a chart illustrating a setting example of repetition transmission of a PUSCH according to the embodiment of the present disclosure.

FIG. 22 is a chart illustrating an example of a beam used for repetition transmission according to the embodiment of the present disclosure.

FIG. 23 is a chart illustrating another example of a beam used for repetition transmission according to the embodiment of the present disclosure.

FIG. 24 is a diagram illustrating an example of resource allocation in repetition transmission according to the embodiment of the present disclosure.

FIG. 25 is a chart illustrating a setting example of repetition transmission of a PUSCH according to the embodiment of the present disclosure.

FIG. 26 is a chart illustrating an example of a beam used for repetition transmission according to the embodiment of the present disclosure.

FIG. 27 is a chart illustrating another example of a beam used for repetition transmission according to the embodiment of the present disclosure.

DESCRIPTION OF EMBODIMENTS

Figure 1:
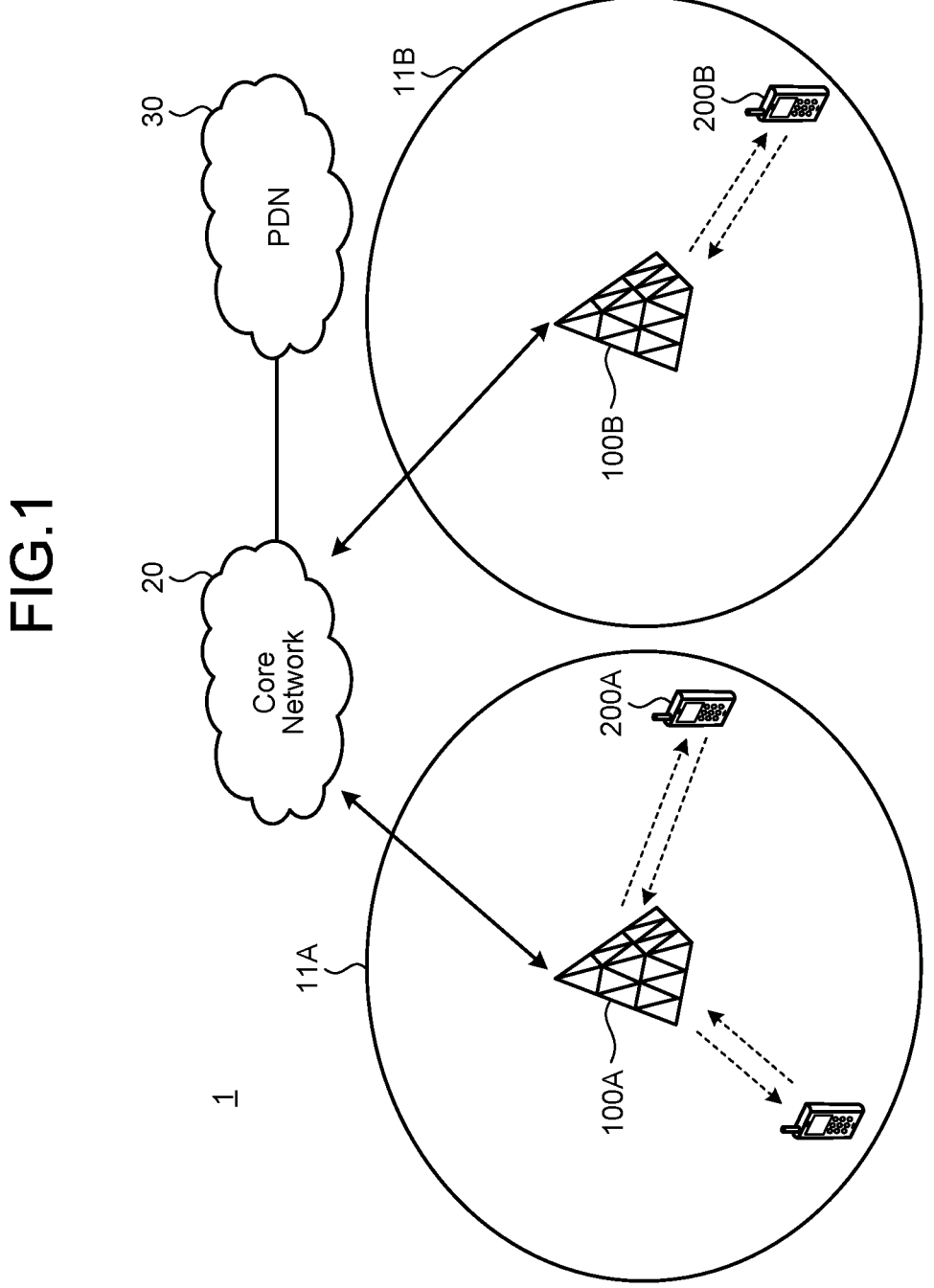
FIG. 1 is a diagram illustrating an example of an overall configuration of a communication system according to an embodiment of the present disclosure.

Hereinafter, embodiments of the present disclosure will be described in detail with reference to the accompanying drawings. Note that redundant descriptions will be omitted from the present specification and the drawings by assigning the same reference signs to components having substantially the same functional configuration.

Furthermore, in the present specification and the drawings, similar components in the embodiments may be distinguished by adding different alphabets after the same reference numerals. However, when there is no need to particularly distinguish similar components from each other, only the same reference numeral is assigned.

One or more embodiments (examples and modifications) described below can each be implemented independently.

On the other hand, at least some of the plurality of embodiments described below may be appropriately combined with at least some of other embodiments. The plurality of embodiments may include novel features different from each other. Accordingly, the plurality of embodiments can contribute to achieving or solving different objects or problems, and can exhibit different effects.

Note that the description will be provided in the following order.

1. Introduction
   1.1. System configuration example
   1.2. Related technology
2. Overview of technical problems and proposed technology
   2.1. Technical problems
   2.2. Overview of proposed technology
3. Configuration examples
   3.1 Configuration example of base station device
   3.2. Configuration example of terminal device
4. Technical features
   4.1. Repetition in one slot
   4.2. Repetition across plurality of slots
   4.3. Repetition transmission of PUSCH
   4.4. Other technical features
5. Modification
6. Summary

1. Introduction

1.1. System Configuration Example

FIG. 1 is a diagram illustrating an example of an overall configuration of a communication system 1 according to the embodiment of the present disclosure. As illustrated in FIG. 1, the communication system 1 includes base station devices 100 (100A and 100B), terminal devices 200 (200A and 200B), a core network 20, and a packet data network (PDN) 30 (or simply Data Network (DN)).

The device in the figure may be considered as a device in a logical sense. That is, parts of the device in the drawing may be partially actualized by a virtual machine (VM), a container, a docker, or the like, and they may be implemented on physically the same piece of hardware.

The base station device in LTE may be referred to as Evolved Node B (eNodeB) or eNB. The NR base station device may be referred to as Next Generation RAN node (NGRAN Node), gNodeB, or gNB. In LTE and NR, a terminal device (also referred to as a mobile station, mobile station device, or terminal) may be referred to as user equipment (UE). The terminal device is a type of communication device, and is also referred to as a mobile station, a mobile station device, or a terminal.

In the present embodiment, the concept of the "communication device" includes not only a portable mobile device (terminal device) such as a mobile terminal but also a device installed in a structure or a mobile body. The structure or a mobile body itself may be regarded as a communication device. In addition, the concept of the communication device includes not only a terminal device but also a base station device. The communication device is a type of processing device and information processing device. The communication device can be paraphrased as a transmission device or a reception device.

[Core Network]

The core network 20, in a case of being an EPC in LTE, can include, for example, a Mobility Management Entity (MME), a Serving gateway (S-GW), a PDN gateway (P-GW), a Policy and Charging Rule Function (PCRF), and a Home Subscriber Server (HSS). MME is a control node that handles signals of the control plane and manages a movement state of a terminal device. S-GW is a control node that handles user plane signals, and is a gateway device that switches a transfer path of user information. The P-GW is a control node that handles user plane signals, and is a gateway device serving as a connection point between the core network 20 and the PDN 30. The PCRF is a control node that performs control related to a policy such as quality of service (QoS) and charging for a bearer. HSS is a control node that handles subscriber data and performs service control. On the other hand, the core network 20, in a case of being 5GC in NR, can include access and mobility management function (AMF), session management function (SMF), user-plane function (UPF), policy control function (PCF), and unified data management (UDM). AMF is a control node that handles signals of the control plane and manages a movement state of the terminal device 200. SMF is a control node that handles signals of the control plane and manages a data transfer path. UPF is a control node that handles user plane signals, and manages a user information transfer path. PCF is a control node that performs control related to a policy. UDM is a control node that handles subscriber data.

[Base Station Device]

The base station device 100 is a radio communication device that performs radio communication with the terminal device 200. The base station device 100 is a type of communication device. The base station device 100 is also a type of information processing device.

The base station device 100 may be composed of a set of a plurality of physical or logical devices. For example, in the embodiment of the present disclosure, the base station device 100 may be classified into a plurality of devices of Baseband Unit (BBU) and Radio Unit (RU), and may be interpreted as an aggregate of these plurality of devices. Additionally or alternatively, in the embodiment of the present disclosure, the base station device 100 may be either or both of BBU and RU. The BBU and the RU may be connected by a predetermined interface (for example, eCPRI). Additionally or alternatively, RU may be referred to as Remote Radio Unit (RRU) or Radio DoT (RD). Additionally or alternatively, the RU may correspond to the gNB-DU described below. Additionally or alternatively, the BBU may correspond to the gNB-CU described below. Additionally or alternatively, the RU may be a device integrally formed with the antenna. An antenna (for example, an antenna integrally formed with an RU) included in the base station device 100 may adopt an Advanced Antenna System and support MIMO (for example, FD-MIMO) or beamforming. In the Advanced Antenna System, an antenna (for example, an antenna integrally formed with an RU) included in the base station device 100 may include 64 transmission antenna ports and 64 reception antenna ports, for example. In addition, the antenna mounted on the RU may be an antenna panel including one or more antenna elements, and the RU may include one or more antenna panels. For example, the RU may include two types of antenna panels of a horizontally polarized antenna panel and a vertically polarized antenna panel, or two types of antenna panels of a clockwise (right-hand) circularly polarized antenna panel and a counterclockwise (left-hand) circularly polarized antenna panel. In addition, the RU may form and control an independent beam for each antenna panel.

The plurality of base station devices 100 may be connected to each other. One or the plurality of base station devices 100 may be included in a radio access network (RAN). That is, the base station device 100 may be simply referred to as a RAN, a RAN node, an Access Network (AN), or an AN node. RAN in LTE is referred to as Enhanced Universal Terrestrial RAN (EUTRAN). RAN in NR is referred to as NGRAN. The RAN in W-CDMA (UMTS) is referred to as UTRAN. The base station device 100 in LTE is referred to as Evolved Node B (eNodeB) or eNB. That is, EUTRAN includes one or a plurality of eNodeBs (eNBs). A NR base station device 100 is referred to as gNodeB or gNB. That is, NGRAN contains one or a plurality of gNBs. In addition, EUTRAN may include gNB (en-gNB) connected to the core network (EPC) in LTE communication systems (EPS). Similarly, NGRAN may include an ng-eNB connected to the core network 5GC in a 5G communication system (5GS). Additionally or alternatively, when the base station device 100 is an eNB, a gNB, or the like, the connection may be referred to as 3GPP Access. Additionally or alternatively, when the base station device 100 is a radio access point, the connection may be referred to as non-3GPP access. Additionally or alternatively, the base station device 100 may be an optical link device referred to as a Remote Radio Head (RRH). Additionally or alternatively, when the base station device 100 is gNB, the base station device 100 may be referred to as any of or a combination of gNB Central Unit (CU) and gNB Distributed Unit (DU). The gNB Central Unit (CU) hosts a plurality of upper layers (for example, RRC, SDAP, and PDCP) of the Access Stratum for communication with the UE. On the other hand, the gNB-DU hosts a plurality of lower layers (for example, RLC, MAC, and PHY) of the Access Stratum. That is, among messages and information described below, RRC signalling (for example, various SIBs including a MIB and a SIB1, an RRCSetup message, and an RRCReconfiguration message) may be generated by the gNB CU, while DCI and various physical channels (for example, PDCCH, PBCH) described below may be generated by the gNB-DU. Alternatively, among the RRC signalling, for example, some configurations such as IE: cell-GroupConfig may be generated by the gNB-DU, and the remaining configurations may be generated by the gNB-CU. These configurations may be transmitted and received through the F1 interface. The base station device 100 may be configured to be able to communicate with another base station device 100. For example, when a plurality of base station devices 100 is eNB each or a combination of eNBs and en-gNBs, the base station devices 100 may be connected by an X2 interface. Additionally or alternatively, when a plurality of base station devices 100 is a combination of gNBs or a combination of a gn-eNB and a gNB, the devices may be connected by an Xn interface. Additionally or alternatively, when the plurality of base station devices 100 is a combination of a gNB central unit (CU) and a gNB distributed unit (DU), the devices may be connected by the above-described F1 interface. The message information (information included in RRC signalling or DCI) described below may be transmitted in communication between a plurality of base station devices 100 (for example, via the X2, Xn, and F1 interfaces).

Furthermore, as described above, the base station device 100 may be configured to manage a plurality of cells. A cell provided by the base station device 100 is referred to as a serving cell. The serving cell includes a primary cell (PCell) and a secondary cell (SCell). In a case where the dual connectivity (for example, EUTRA-EUTRA Dual Connectivity, EUTRA-NR Dual Connectivity (ENDC), EUTRA-NR Dual Connectivity with 5GC, NR-EUTRA Dual Connectivity (NEDC), or NR-NR Dual Connectivity) is provided to the UE (the terminal device 200, for example), the PCell and zero or one or more SCell(s) provided by a Master Node (MN) are referred to as a Master Cell Group. Furthermore, the serving cell may include a Primary Secondary Cell or Primary SCG Cell (PSCell). That is, in a case where dual connectivity is provided to the UE, the PSCell and the SCell(s), which is zero, or one or more, provided by a secondary node (SN) are referred to as Secondary Cell Group (SCG). Unless specially configured (for example, PUCCH on SCell), a physical uplink control channel (PUCCH) is transmitted in the PCell and the PSCell, but is not transmitted in the SCell. In addition, a radio link failure is also detected in the PCell and the PSCell, but is not detected in the SCell (need not be detected). In this manner, since the PCell and the PSCell have a special role in the Serving Cell(s), these cells are also referred to as Special Cells (SpCells). One cell may be associated with one downlink component carrier and one uplink component carrier. In addition, the system bandwidth corresponding to one cell may be divided into a plurality of bandwidth parts. In this case, one or a plurality of bandwidth parts (BWP) may be configured for the UE, and one bandwidth part may be used for the UE as an Active BWP. In addition, radio resources (for example, a frequency band, a numerology (subcarrier spacing), and a slot format (slot configuration)) usable by the terminal device 200 may be different for each cell, each component carrier, or each BWP.

[Terminal Device]

The terminal device 200 is a radio communication device that performs radio communication with the base station device 100. Examples of the terminal device 200 include a mobile phone, a smart device (smartphone or tablet), a personal digital assistant (PDA), or a personal computer.

Furthermore, the terminal device 200 may be capable of sidelink communication with another terminal device 200. When performing sidelink communication, the terminal device 200 may be capable of using an automatic retransmission technology such as hybrid automatic repeat request (Hybrid ARQ (HARQ)). The terminal device 200 may be capable of Non-Orthogonal Multiple Access (NOMA) communication with the base station device 100. The terminal device 200 may also be capable of NOMA communication in the communication (sidelink) with another terminal device 200. Furthermore, the terminal device 200 may be capable of performing low power wide area (LPWA) communication with other communication devices (for example, the base station device 100 and another terminal device 200). In addition, the radio communication used by the terminal device 200 may be radio communication using millimeter waves. The radio communication (including sidelink communication) used by the terminal device 200 may be wireless communication using radio waves or wireless communication (optical wireless communication) using infrared rays or visible light.

The terminal device 200 may perform communication while being simultaneously connected to a plurality of base station devices 100 or a plurality of cells. For example, when one base station device 100 can provide a plurality of cells, the terminal device 200 can perform carrier aggregation by using one cell as a pCell and using another cell as an sCell. Furthermore, in a case where a plurality of base station devices 100 can provide one or a plurality of cells, the terminal device 200 can implement dual connectivity (DC) by using one or a plurality of cells managed by one base station device 100 (MN (for example, MeNB or MgNB)) as a pCell or a pCell and a sCell (s) and using one or a plurality of cells managed by the other base station device 100 (SN (for example, the SeNB or the SgNB)) as a pCell (PSCell) or a pCell (PSCell) and sCell(s). The DC may be referred to as multi connectivity (MC).

When the communication area is supported via a plurality of cells of different base station devices 100 (a plurality of cells having different cell identifier or same cell identifier), it is possible to bundle the plurality of cells and communicate between the base station device 100 and the terminal device 200 by using a carrier aggregation (CA) technology, a dual connectivity (DC) technology, or a multi-connectivity (MC) technology. Alternatively, the terminal device 200 and the plurality of base station devices 100 can communicate with each other by a Coordinated Multi-Point Transmission and Reception (CoMP) technology via cells of different base station devices 100.

1.2. Related Technology (1) Beam Sweeping Process

Figure 2:
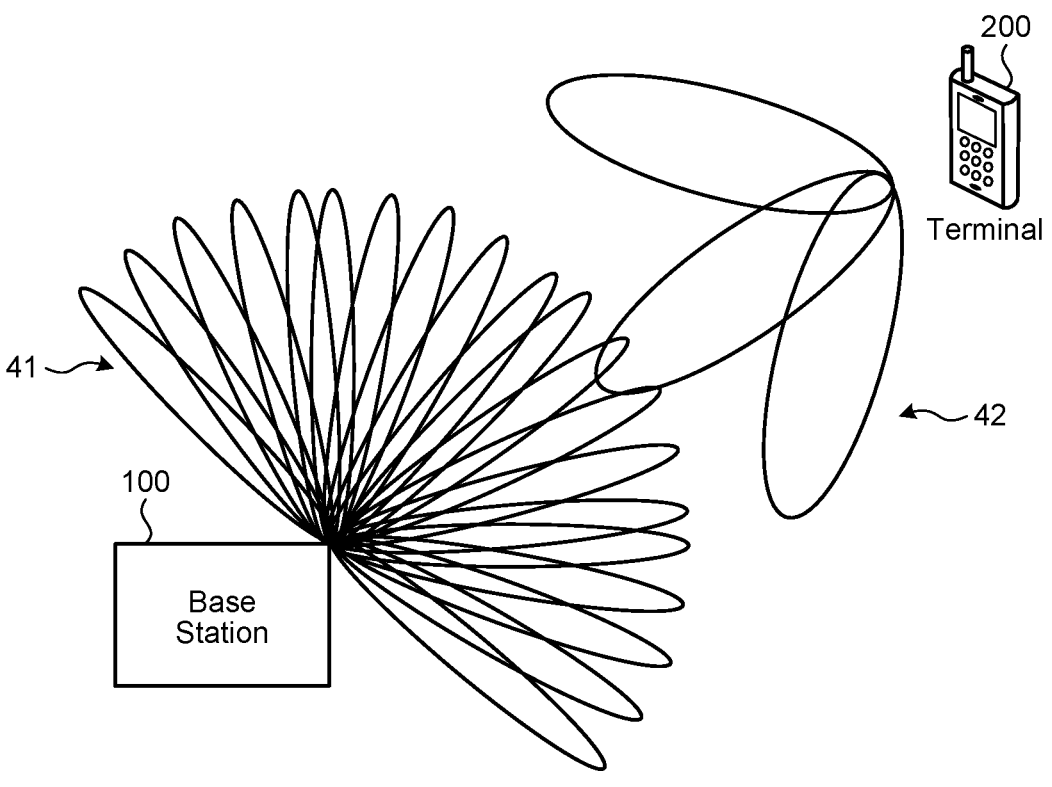
FIG. 2 is a diagram illustrating beamforming by a base station device.
Figure 3:
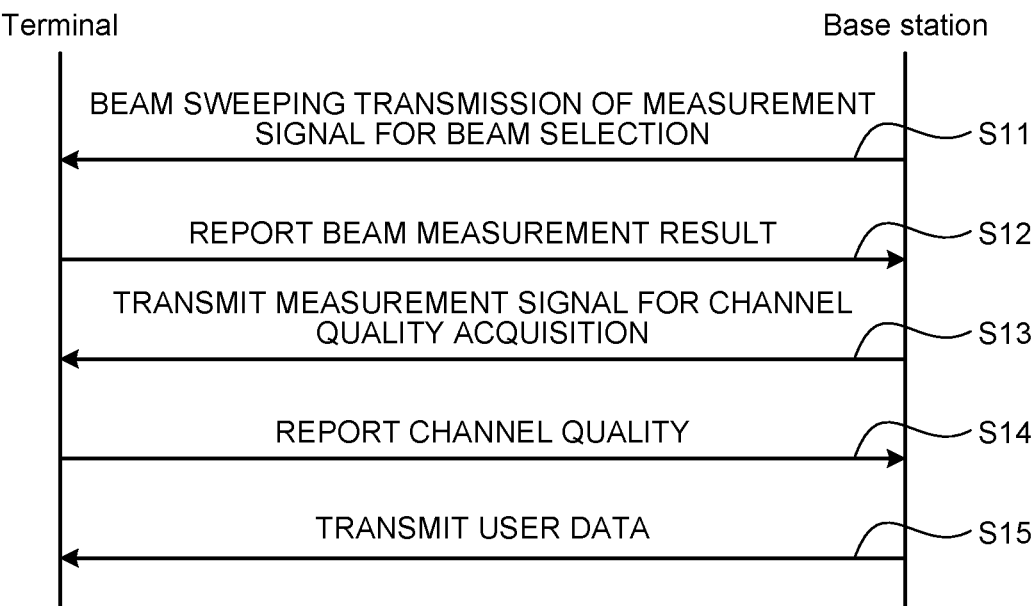
FIG. 3 is a sequence diagram illustrating a beam sweeping process.

In 5G, beamforming is performed by the base station device 100 and the terminal device 200. Beamforming by the base station device 100 will be described with reference to FIGS. 2 and 3. FIG. 2 is a diagram illustrating beams used by the base station device 100 and the terminal device 200. FIG. 3 is a sequence diagram illustrating a beam sweeping process. In FIGS. 2 and 3, the terminal corresponds to the terminal device 200, and the base station corresponds to the base station device 100.

As illustrated in FIG. 2, the base station device 100 forms a plurality of beams 41. In addition, the terminal device 200 forms a plurality of beams 42. Therefore, when communicating with the terminal device 200 using beamforming, the base station device 100 first executes the beam sweeping process. The beam sweeping process is a process for determining a desirable beam between the base station device 100 and the terminal device 200.

The beam sweeping process performed between the base station device 100 and the terminal device 200 will be described with reference to FIG. 3.

As illustrated in FIG. 3, the base station device 100 transmits a beam while performing sweeping (step S11). Next, the terminal device 200 measures the power of the reception signal while sweeping the beam, and based on the measurement result, the terminal device 200 transmits, to the base station device 100 a beam report including information regarding a beam desired as a transmission beam for the base station device 100 and a beam desired as a reception beam for the terminal device 200 (step S12).

Based on the beam report, the base station device 100 transmits a reference signal to the terminal device 200 using the determined transmission beam (step S13). The terminal device 200 reports the channel quality measured based on the reference signal to the base station device 100 (step S14). Based on the reported channel quality, the base station device 100 transmits user data to the terminal device 200 using the determined transmission beam (step S15).

(2) Beamforming of Terminal Device (2-1) Reception Beam and Transmission Beam

Figure 4:
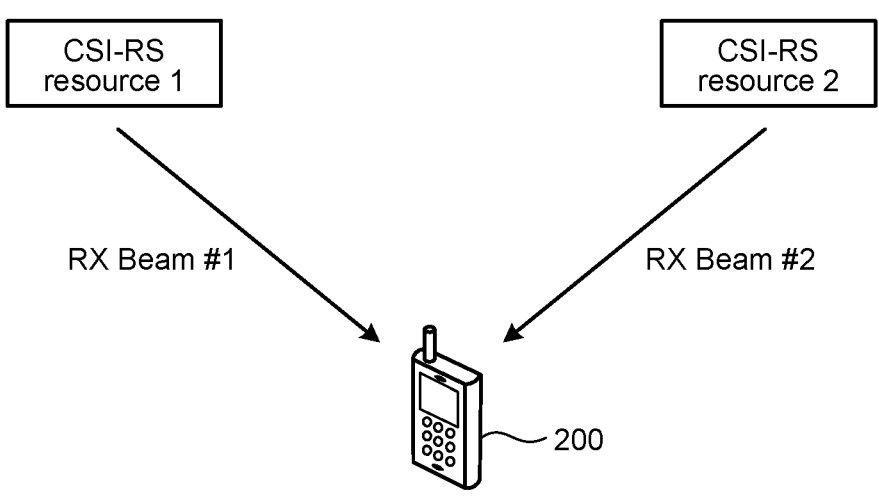
FIG. 4 is a diagram illustrating a reception beam used by a terminal device.
Figure 5:
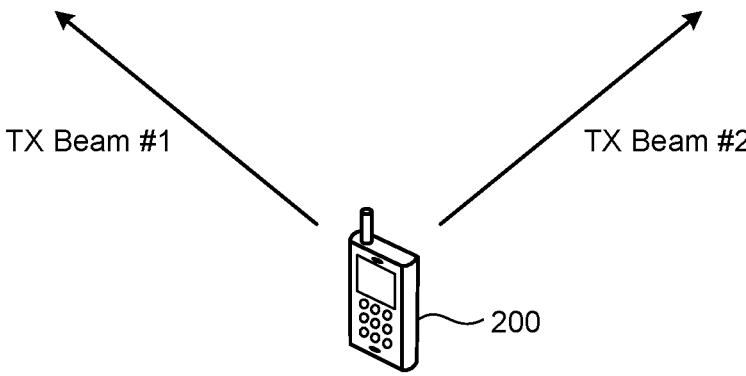
FIG. 5 is a diagram illustrating a transmission beam used by a terminal device.

Beamforming of the terminal device 200 will be described with reference to FIGS. 4 and 5. FIG. 4 is a diagram illustrating a reception beam used by the terminal device 200. FIG. 5 is a diagram illustrating a transmission beam used by the terminal device 200.

As described above, the base station device 100 transmits a signal by using a beam in the downlink. The terminal device 200 also receives a signal by using a beam in the downlink.

In FIG. 4, using a reception beam #1 (RX beam #1), the terminal device 200 receives a CSI-RS transmitted by the base station device 100 on channel state information-reference signal (CSI-RS) resource 1. Furthermore, using a reception beam #2 (RX beam #2), the terminal device 200 receives a CSI-RS transmitted by the base station device 100 on CSI-RS resource 2. In the present specification, a number following the symbol #represents an index.

Furthermore, in the example of FIG. 5, the terminal device 200 performs uplink communication using a transmission beam #1 (TX Beam #1) having the same directivity as the reception beam #1 or using a transmission beam #2 (TX Beam #2) having the same directivity as the reception beam #2.

Here, when the terminal device 200 uses the transmission beam in the uplink, the base station device 100 designates the transmission beam to be used by the terminal device 200. The base station device 100 instructs the terminal device 200 to perform uplink communication using a transmission beam having the same directivity as the reception beam used for receiving the CSI-RS, for example. By designating the ID of the resource (CSI-RS resource) that has transmitted the CSI-RS, the base station device 100 designates the transmission beam to be used by the terminal device 200 in the uplink.

For example, it is assumed that the base station device 100 designates the ID of the CSI-RS resource 1 in FIG. 4. In this case, the terminal device 200 performs communication using a transmission beam #1 (refer to FIG. 5) having the same directivity as the reception beam #1 used to receive the CSI-RS transmitted on the CSI-RS resource 1.

Furthermore, it is assumed that the base station device 100 designates the ID of the CSI-RS resource 2 in FIG. 4. In this case, the terminal device 200 performs communication using a transmission beam #2 (refer to FIG. 5) having the same directivity as the reception beam #2 used to receive the CSI-RS transmitted on the CSI-RS resource 2.

Note that the reception beam to be used for receiving the CSI-RS is selected when the terminal device 200 receives the CSI-RS. Furthermore, the base station device 100 designates a transmission beam to be used by the terminal device 200 when the terminal device 200 transmits a reference signal (SRS), a control signal (PUCCH), and user data (PUSCH) in the uplink. The base station device 100 designates a transmission beam using, for example, a downlink control signal (PDCCH).

(2-2) Plurality of Transmission Beams

As described above, the terminal device 200 performs uplink communication by using a plurality of transmission beams. At this time, the terminal device 200 can perform communication simultaneously using a plurality of transmission beams in some cases and cannot simultaneously use a plurality of transmission beams in other cases.

Availability of a plurality of transmission beams depends on the capability of the terminal device 200. This is because some terminal device 200 is not provided with a function for simultaneously using a plurality of transmission beams due to the configuration of the transmitter or from the viewpoint of cost.

(2-3) Example of Signal Transmitted Using Beam

The terminal device 200 transmits a physical uplink control channel (PUCCH) and a physical uplink shared channel (PUSCH) using a transmission beam.

PUCCH is a channel for transmitting a control signal, and is mainly used for reporting ACK/NACK for notifying success/failure of PDSCH reception, which is a downlink user data signal. In addition, the PUCCH is used for transmission of information reported by the terminal device 200 to the base station device 100 in addition to the ACK/NACK report.

PUSCH is a channel for transmitting a user data signal. In the present embodiment, it is assumed that the terminal device 200 uses beamforming in transmission of the PUCCH and the PUSCH.

(3) Configuration Example of Slot

Figure 6:
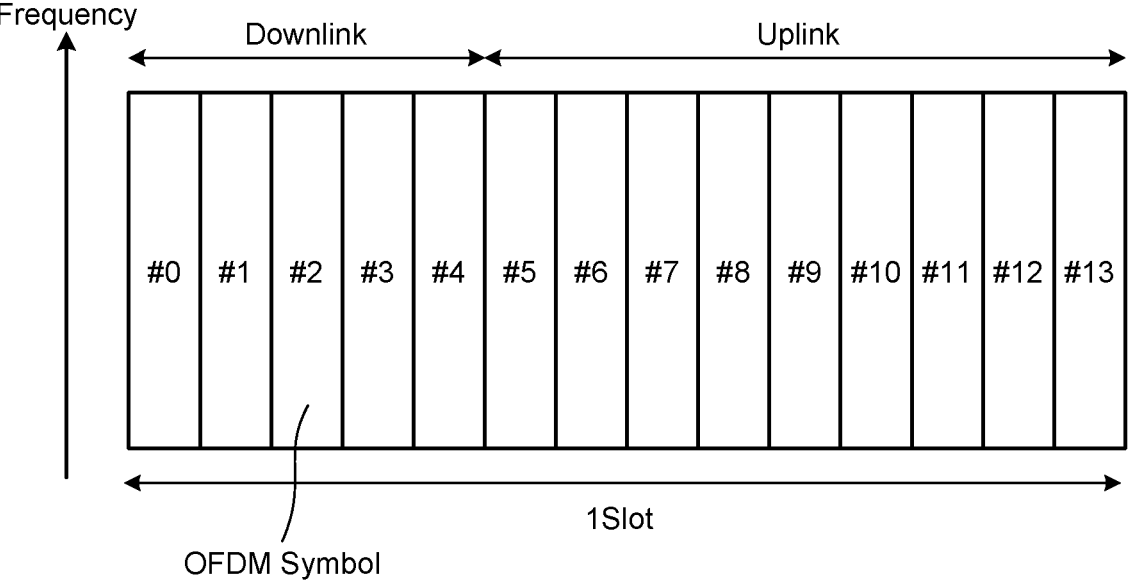
FIG. 6 is a diagram illustrating a configuration example of a slot of a radio frame.

A slot configuration example of a radio frame used in the communication system 1 will be described with reference to FIG. 6. FIG. 6 is a diagram illustrating a configuration example of a slot of a radio frame.

Starting from 3GPP NR technical standard Release 15, the ratio of OFDM symbols allocated to an uplink and a downlink in a radio frame can be dynamically changed.

As illustrated in FIG. 6, one slot of the radio frame includes 14 OFDM symbols. One slot has a length of 1 ms, for example, and has a frequency bandwidth of 20 MHz, for example. One slot includes 14 OFDM symbols, specifically, #0 to #13, for example. The first part of the slot is a downlink OFDM symbol and the second part is an uplink OFDM symbol.

In the example of FIG. 6, the downlink is allocated to the OFDM symbols #0 to #4, and the uplink is allocated to the OFDM symbols #5 to #13, although this is an example. The ratio between the downlink and the uplink is not limited to the example in FIG. 6. The number of downlink or uplink OFDM symbols may be any number as long as it is in a range 0 to 14.

In this manner, in the slot of NR, the number of OFDM symbols usable in the uplink greatly changes depending on the setting.

2. Overview of Technical Problems and Proposed Technology

2.1. Technical Problems

Improvement in quality and reliability is required also in uplink communication as well as in downlink communication. Examples of use cases in which quality and reliability are required in uplink communication include live-streaming. For example, this can include a case, in a live-streaming of a news scene or music, which is a case in which a live video or the like captured by an imaging camera (an example of the terminal device 200) is transmitted to a broadcast station in an uplink using a 5G technology, and the broadcast station processes the live video and broadcasts the processed live video to a viewer. At this time, in order to broadcast a high-quality and highly reliable live video to a viewer, it is required to transmit the live video with high quality and high reliability in uplink communication.

In this manner, it is required to improve the quality and reliability in uplink PUCCH and PUSCH transmission. One of the known techniques for improving the quality and reliability of communication is repetition transmission.

For example, 3GPP technical standard Release 16 3GPP TS 38.213 Section 9.2 describes Intra Slot Repetition in which repetition transmission is performed in one slot. However, this Intra Slot Repetition is repetition transmission in which consideration of transmission beams is insufficient.

In this manner, there has been no conventional means of performing repetition transmission using a plurality of beams in uplink communication. Therefore, the present disclosure proposes a mechanism of performing repetition transmission using a plurality of beams in the uplink.

2.2. Overview of Proposed Technology

In view of this, in the technology of the present disclosure, the base station device 100 transmits, to the terminal device 200, information regarding the repetition in a case where the repetition transmission is performed in uplink (hereinafter, also described as repetition information) and information regarding the beam used for repetition transmission (hereinafter, also described as beam information) in association with each other.

When having received repetition information and beam information, based on the repetition information, the terminal device 200 performs repetition transmission using a beam designated by the beam information.

In this manner, the base station device 100 transmits the repetition information and the beam information in association with each other, making it possible for the terminal device 200 to perform the repetition transmission using the plurality of beams in the uplink. This can improve uplink quality and reliability.

3. Configuration Examples

3.1. Configuration Example of Base Station Device

Figure 7:
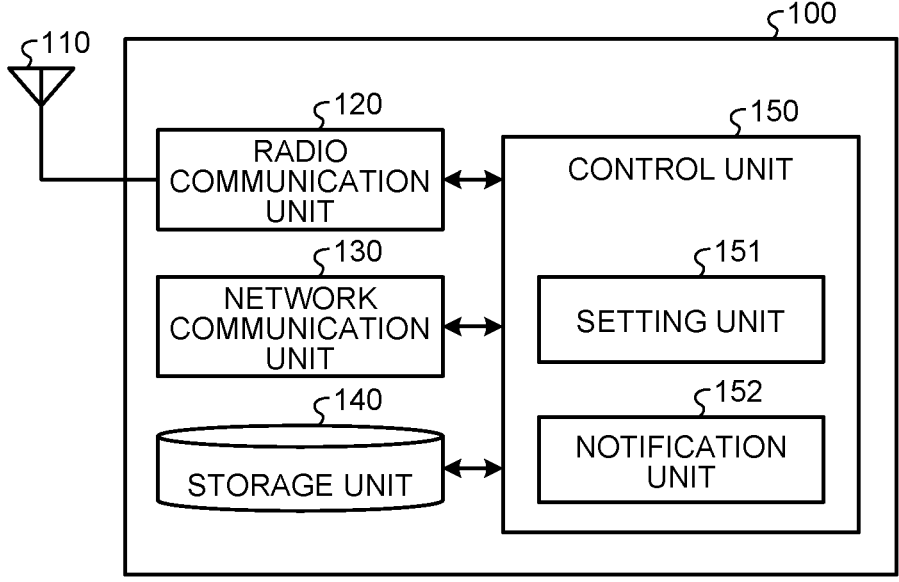
FIG. 7 is a block diagram illustrating an example of a configuration of a base station device according to the embodiment of the present disclosure.

FIG. 7 is a block diagram illustrating an example of the configuration of the base station device 100 according to the embodiment of the present disclosure. Referring to FIG. 7, the base station device 100 includes an antenna unit 110, a radio communication unit 120, a network communication unit 130, a storage unit 140, and a control unit 150.

(1) Antenna Unit 110

The antenna unit 110 radiates the signal output by the radio communication unit 120 to space as a radio wave. Furthermore, the antenna unit 110 converts a radio wave in space into a signal and outputs the signal to the radio communication unit 120. Note that the antenna unit 110 of the present embodiment includes a plurality of antenna elements and can form a beam.

(2) Radio Communication Unit 120

The radio communication unit 120 transmits and receives signals. For example, the radio communication unit 120 transmits a downlink signal to the terminal device 200 and receives an uplink signal from the terminal device 200. Note that the radio communication unit 120 of the present embodiment can communicate with the terminal device 200 by forming a plurality of beams by the antenna unit 110.

(3) Network Communication Unit 130

The network communication unit 130 transmits and receives information. For example, the network communication unit 130 transmits information to another node and receives information from another node. For example, the other nodes include other base station devices 100 and core network nodes.

(4) Storage Unit 140

The storage unit 140 temporarily or permanently stores a program and various types of data for the operation of the base station device 100.

(5) Control Unit 150

The control unit 150 controls the operation of the entire base station device 100 and provides various functions of the base station device 100. The control unit 150 includes a setting unit 151 and a notification unit 152.

The setting unit 151 has a function of performing setting related to communication with the terminal device 200. For example, the setting unit 151 performs setting related to uplink repetition transmission. In addition, the notification unit 152 notifies the terminal device 200 of the setting information by the setting unit 151.

The control unit 150 can further include other components other than these components. That is, the control unit 150 can perform operations other than the operations of these components.

3.2. Configuration Example of Terminal Device

Figure 8:
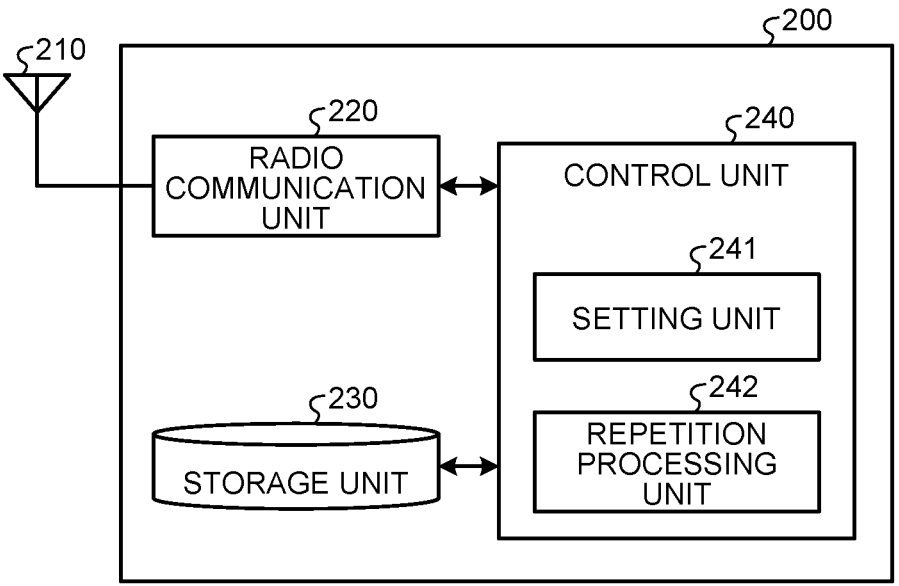
FIG. 8 is a block diagram illustrating an example of a configuration of a terminal device according to the embodiment of the present disclosure.

FIG. 8 is a block diagram illustrating an example of a configuration of the terminal device 200 according to the embodiment of the present disclosure. Referring to FIG. 18, the terminal device 200 includes an antenna unit 210, a radio communication unit 220, a storage unit 230, and a control unit 240.

(1) Antenna Unit 210

The antenna unit 210 radiates the signal output by the radio communication unit 220 to space as a radio wave. Furthermore, the antenna unit 210 converts a radio wave in space into a signal and outputs the signal to the radio communication unit 220. Note that the antenna unit 210 of the present embodiment includes a plurality of antenna elements and can form a beam.

(2) Radio Communication Unit 220

The radio communication unit 220 transmits and receives signals. For example, the radio communication unit 220 receives a downlink signal from the base station device 100 and transmits an uplink signal to the base station device 100. Note that the radio communication unit 220 of the present embodiment can communicate with the base station device 100 by forming a plurality of beams by the antenna unit 210.

Here, in the present embodiment, the antenna unit 210 and the radio communication unit 220 include a plurality of antenna panels (not illustrated). The terminal device 200 performs communication by forming a plurality of beams for each antenna panel, for example.

(3) Storage Unit 230

The storage unit 230 temporarily or permanently stores a program and various data for the operation of the terminal device 200.

(4) Control Unit 240

The control unit 240 controls the operation of the entire terminal device 200 and provides various functions of the terminal device 200. The control unit 240 includes a setting unit 241 and a repetition processing unit 242.

The setting unit 241 performs setting of the repetition transmission based on the setting information regarding the repetition transmission on the uplink received from the base station device 100. The repetition processing unit 242 performs repetition transmission based on the setting of the setting unit 241.

The control unit 240 can further include other components other than these components. That is, the control unit 240 can perform operations other than the operations of these components.

4. Technical Features

4.1. Repetition in One Slot

In a case where repetition transmission is performed using a plurality of beams having different directivities, it is desirable that the base station device 100 perform setting of the repetition transmission in consideration of various capabilities of the terminal device 200. For example, different terminal devices 200 have different capabilities regarding simultaneous use of different beams. Specifically, some terminal devices 200 can perform uplink transmission by simultaneously using a plurality of different beams, while other terminal devices cannot simultaneously use a plurality of different beams and perform uplink transmission using different beams in time division. It is important that the base station device 100 gives an instruction for repetition transmission in consideration of such capabilities of the terminal device 200.

(Example of Repetition Transmission)

Here, an example of repetition transmission performed by the terminal device 200 will be described with reference to FIGS. 9, 10, 11A, 11B, 11C, 11D, and 11E. In an assumable case of repetition transmission, the terminal device 200 transmits a same signal four times using two beams (Beams #1 and #2) having different directivities.

Figure 9:
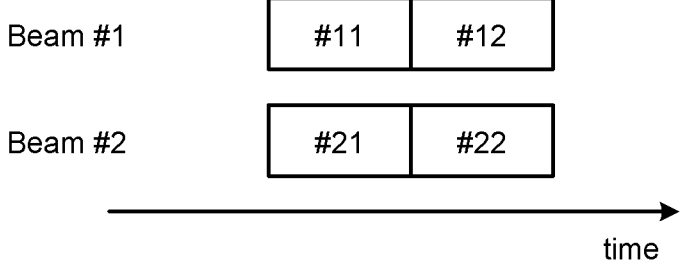
FIG. 9 is a diagram illustrating an example of repetition transmission performed by the terminal device according to the embodiment of the present disclosure.

FIG. 9 is a diagram illustrating an example of repetition transmission performed by the terminal device 200 according to the embodiment of the present disclosure.

For example, it is assumed that the terminal device 200 performs repetition transmission using two beams (Beams #1 and #2) simultaneously. In this case, the terminal device 200 transmits signals on the resources #11 and #12 by using Beam #1. The resources #11 and #12 are uplink resources having the same frequency band and different time spans. In addition, the terminal device 200 transmits signals on the resources #21 and #22 using Beam #2. The resources #21 and #22 are uplink resources having the same frequency band and different time spans. In addition, the resources #11 and #21 belong to the same time resource, while the resources #12 and #22 belong to the same time resource.

In this manner, when the terminal device 200 can simultaneously use different beams, the base station device 100 can set the repetition transmission so as to transmit the signal by using a plurality of different beams on the same time resource.

Figure 10:
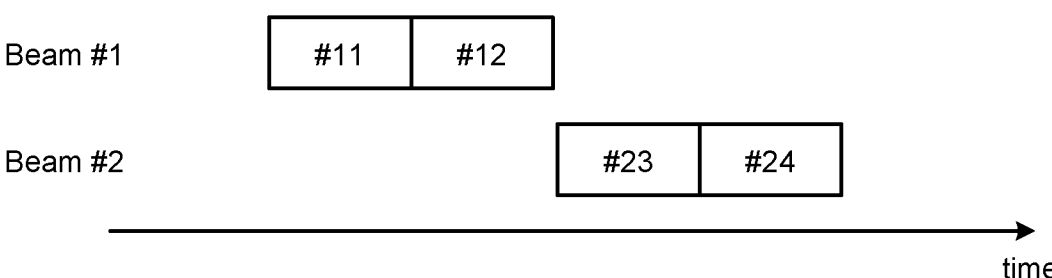
FIG. 10 is a diagram illustrating another example of repetition transmission performed by the terminal device according to the embodiment of the present disclosure.

FIG. 10 is a diagram illustrating another example of repetition transmission performed by the terminal device 200 according to the embodiment of the present disclosure.

For example, here is an assumable case where the terminal device 200 performs repetition transmission using two beams (Beams #1 and #2) in time division. In this case, the terminal device 200 transmits signals on the resources #11 and #12 by using Beam #1. In addition, the terminal device 200 transmits signals on the resources #23 and #24 using Beam #2. The resources #23 and #24 are uplink resources having the same frequency band and different time spans. In the example of FIG. 10, all of the resources #11, #12, #23, and #24 are resources with different time spans.

In this manner, the base station device 100 can set the repetition transmission such that the terminal device 200 transmits a signal using a plurality of beams on different time resources.

For example, in a case where the terminal device 200 has a capability of simultaneously using a plurality of beams, the base station device 100 instructs the terminal device 200 to perform the repetition transmission illustrated in FIG. 9 or 10.

In contrast, in a case where the terminal device 200 does not have the capability of simultaneously using a plurality of beams, the base station device 100 instructs the terminal device 200 to perform the repetition transmission illustrated in FIG. 10.

In the repetition transmission described above, the terminal device 200 performs the repetition transmission four times by transmitting signals the same number of times (twice in FIGS. 9 and 10) for each of the plurality of beams (Beams #1 and #2). Hereinafter, the number of times of transmitting the same signal in each beam is also referred to as the number of repetitions, while the number of times of transmitting the same signal using all beams is also referred to as the total number of repetitions. That is, in the above-described repetition transmission, the total number of repetitions is "4", and the number of repetitions of Beam #1 and Beam #2 is "2" in each beam.

Note that the number of repetitions in a case where uplink repetition transmission is performed using a plurality of beams does not need to be uniform in each beam, and the number of repetitions of signals transmitted in each beam may be non-uniform. This case will be described with reference to FIGS. 11A, 11B, 11C. 11D, and 11E.

FIGS. 11A, 11B, 11C, 11D, and 11E are diagrams illustrating other examples of repetition transmission performed by the terminal device 200 according to the embodiment of the present disclosure. In a case where the total number of repetitions is "4", the number of repetitions for transmitting a signal by using one beam by the terminal device 200 may be any one of 0 to 4.

Figures 11A, 11B, 11C:
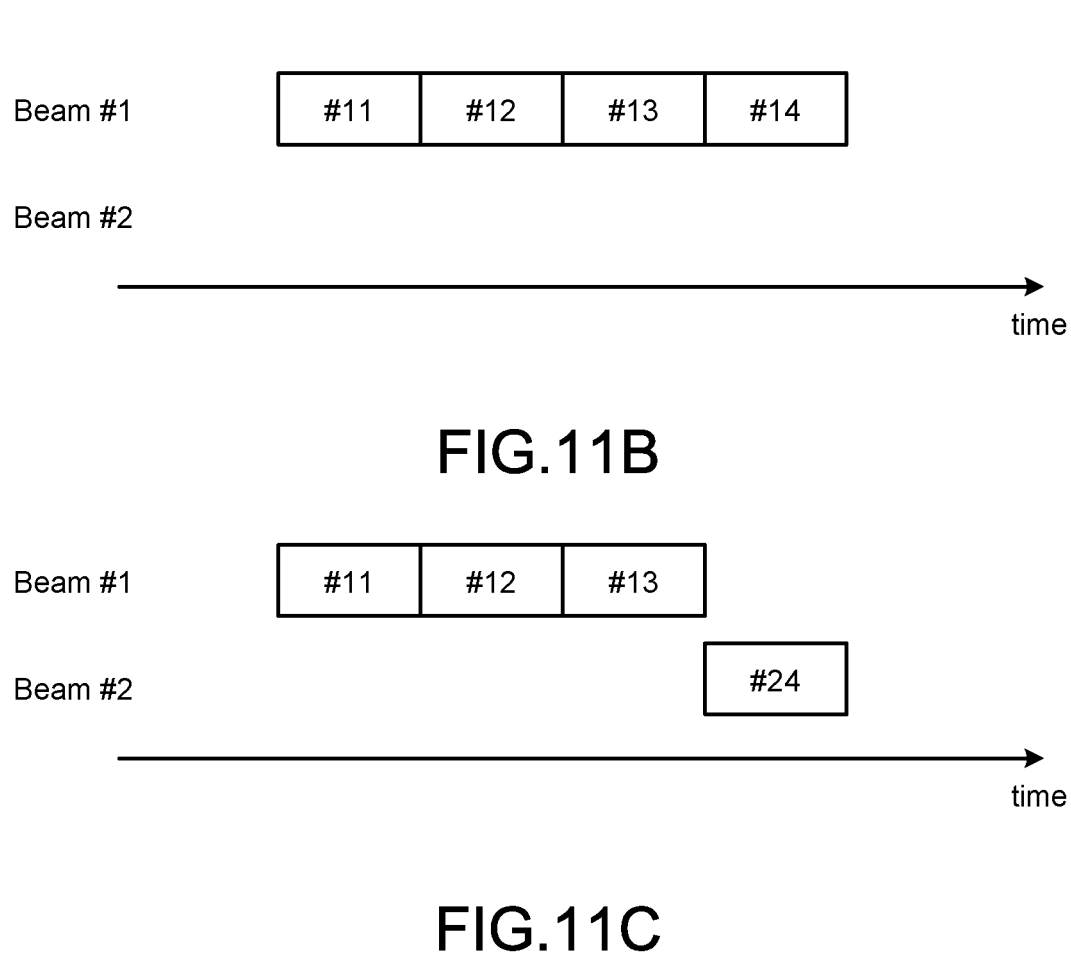
FIG. 11A is a diagram illustrating another example of repetition transmission performed by a terminal device 200 according to the embodiment of the present disclosure.
FIG. 11B is a diagram illustrating another example of repetition transmission performed by the terminal device 200 according to the embodiment of the present disclosure.
FIG. 11C is a diagram illustrating another example of repetition transmission performed by the terminal device 200 according to the embodiment of the present disclosure.

FIG. 11A illustrates an example in which the terminal device 200 uses Beam #1 four times and performs repetition transmission without using Beam #2. In this case, the terminal device 200 performs repetition transmission of signals on the resources #11, #12, #13, and #14 by using Beam #1.

FIG. 11B illustrates an example in which Beam #1 is used three times and Beam #2 is used once to perform repetition transmission. In this case, the terminal device 200 transmits a signal on the resources #11, #12, and #13 by using Beam #1, and then transmits a signal on the resource #24 by using Beam #2.

FIG. 11C illustrates an example in which repetition transmission is performed using Beam #1 twice and Beam #2 twice. In this case, the terminal device 200 transmits a signal on the resources #11 and #12 by using Beam #1, and then transmits a signal by using the resources #23 and #24 by using Beam #2.

Figure 11D:
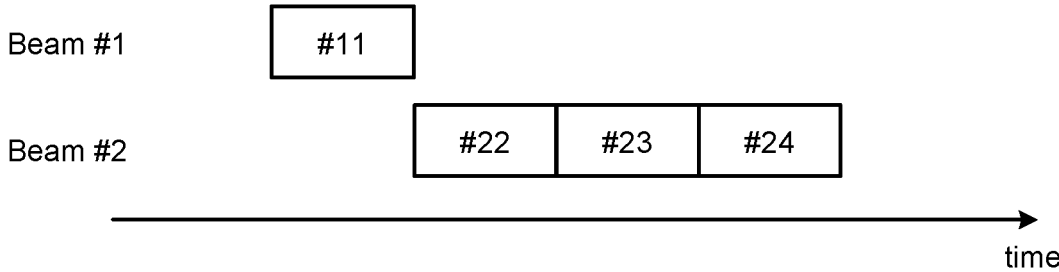
FIG. 11D is a diagram illustrating another example of repetition transmission performed by the terminal device 200 according to the embodiment of the present disclosure.

FIG. 11D illustrates an example in which repetition transmission is performed using Beam #1 once and Beam #2 three times. In this case, the terminal device 200 transmits a signal on the resource #11 by using Beam #1, and then transmits a signal on the resources #22, #23, and #24 by using Beam #2.

Figure 11E:
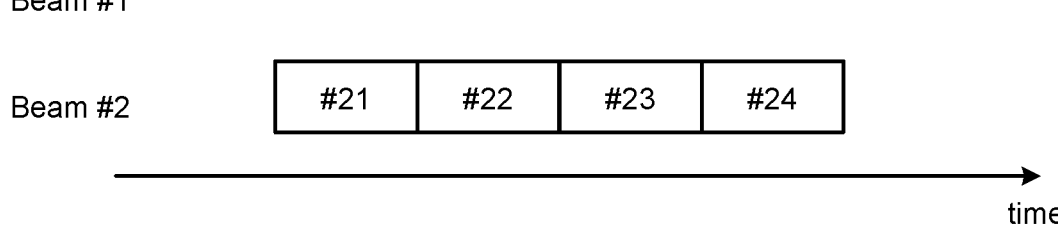
FIG. 11E is a diagram illustrating another example of repetition transmission performed by the terminal device 200 according to the embodiment of the present disclosure.

FIG. 11E illustrates an example in which the terminal device 200 performs repetition transmission using Beam #2 four times without using Beam #1. In this case, the terminal device 200 performs repetition transmission of the signal on the resources #11, #12, #13, and #14.

The base station device 100 determines the number of repetitions of each beam according to the quality of each beam, for example. For example, when the quality of Beam #1 is worse than the quality of Beam #2, the base station device 100 determines the number of repetitions of each beam so that the number of repetitions of Beam #2 is larger than the number of repetitions of Beam #1.

The base station device 100 determines the number of repetitions of each beam according to the reliability of the beams #1 and #2, for example. For example, the base station device 100 can divide each beam into a case where the reliability of each beam is high, a case where the reliability of each beam is low, and an equivalent case, and can change the number of repetitions of each beam corresponding to each case.

The base station device 100 estimates the reliability of each beam based on a received signal strength of the reception beam notified by the terminal device 200, for example. Note that the terminal device 200 reports, to the base station device 100, received signal strength at the time of receiving a downlink reference signal (RS) by using a reception beam.

When uplink communication and downlink communication are performed in time division duplex (TDD) in the same frequency band, beam quality is the same in downlink communication and uplink communication. Therefore, based on the quality of reception beams of the terminal device 200, the base station device 100 can estimate the quality of a transmission beam having the same directivity as the reception beam.

For example, in a case where the quality (reliability) of Beam #1 is very high, the base station device 100 sets the number of repetitions of Beam #1 to "4" and the number of repetitions of Beam #2 to "0" as illustrated in FIG. 11A.

For example, in a case where Beams #1 and #2 have an equivalent quality, the base station device 100 sets the number of repetitions of Beam #1 to "2" and the number of repetitions of Beam #2 to "2" as illustrated in FIG. 11C.

In this manner, the base station device 100 sets the number of repetitions of each beam according to the quality of the beam, making it possible for the terminal device 200 to perform repetition transmission with higher quality. Furthermore, by setting the base station device 100 to perform repetition transmission using a plurality of different beams, even in a case where one beam is blocked by an obstacle, for example, the signal can be transmitted using the remaining beams, making it possible to improve the reliability of the repetition transmission by the terminal device 200.

Although FIGS. 11A, 11B, 11C, 11D, and 11E illustrate a case where the terminal device 200 performs repetition transmission by using a plurality of beams in time division, transmission of the beams is not limited thereto. For example, even in a case where the terminal device 200 performs repetition transmission using a plurality of beams simultaneously, the base station device 100 may change the number of repetitions of each beam.

Example of Repetition Setting Information

Next, the repetition setting information that the base station device 100 notifies the terminal device 200 will be described. The repetition setting information is setting information regarding repetition transmission using a plurality of beams by the terminal device 200, and includes: repetition information regarding the repetition transmission; and beam information regarding the beam used for the repetition transmission, for example.

For example, the base station device 100 notifies the terminal device 200 of a combination of the number of repetitions of each beam as repetition setting information. As described above, in a case where the repetition transmission is performed using the two beams, namely, Beams #1 and #2, the base station device 100 notifies the terminal device 200 of information in the form of (Number of repetitions of Beam #1, Number of repetitions of Beam #2) as the setting information.

For example, in a case where the repetition transmission illustrated in any one of FIGS. 11A, 11B, 11C, 11D, and 11E is to be performed, the base station device 100 sets any one of (4, 0), (3, 1), (2, 2), (1, 3), and (0, 4) and notifies the terminal device 200 of the setting. For example, (4, 0) indicates that the number of repetitions of Beam #1 is "4" and the number of repetitions of Beam #2 is "0".

In this manner, the base station device 100 notifies the terminal device 200 of the combination (i, j) of the number of repetitions of each beam as the repetition setting information. With this configuration, the base station device 100 can notify the terminal device 200 of the repetition information (for example, the number of repetitions) related to the repetition transmission and the information (for example, the number of beams used for repetition transmission) related to the beam in association with each other.

Note that, here, the base station device 100 notifies the terminal device 200 of the repetition setting information including the repetition information and the beam information, in other words, notifies the terminal device 200 of the repetition information and the beam information simultaneously, but the configuration is not limited thereto.

For example, in a case where the number of repetitions of each beam is the same, the base station device 100 may separately notify the terminal device 200 of the repetition information including the number of repetitions and the beam information including the number of beams used for the repetition transmission. In this manner, the base station device 100 may notify the terminal device 200 of the repetition information and the beam information corresponding to the repetition information at different timings. That is, the base station device 100 may simultaneously notify the terminal device 200 of the combination of the repetition information and the beam information, or may notify the terminal device at different timings.

Note that the base station device 100 can dynamically set the repetition transmission by notifying the terminal device 200 of the repetition setting information using downlink control information (DCI), for example. Alternatively, the base station device 100 may semi-statically set the repetition transmission by notifying the terminal device 200 of the repetition setting information using RRC signaling, for example.

Using the repetition setting information described above, the base station device 100 performs setting to perform repetition transmission using two beams, and also performs designation of a beam to be used to determine which beam to be used specifically. The base station device 100 notifies the terminal device 200 of designation information, which is information designating the beam to be used, for example, thereby designating the beam to be used for the repetition transmission.

As described above, the base station device 100 designates the reception beam used when the CSI-RS or the like is received in the downlink communication, thereby designating the transmission beam having the same directivity as the reception beam to be used for the repetition transmission.

Table 1 is a table illustrating a beam designation method implemented by the base station device 100. For example, the base station device 100 designates the ID of the resource used to transmit the CSI-RS, thereby designating the reception beam and the antenna panel used to receive the CSI-RS on the resource. With this configuration, the terminal device 200 performs the repetition transmission using the transmission beam having the same directivity as the reception beam designated by the base station device 100 and the antenna panel used at the time of reception.

TABLE 1

| Beam Designation Method | |
| --- | --- |
| Uplink Beam #1 | CSI-RS resource ID 1 |
| Uplink Beam #2 | CSI-RS resource ID 2 |

For example, in Table 1, the base station device 100 designates ID of the CSI-RS resource 1 (CSI-RS resource ID 1) as uplink Beam #1. With this operation, the TX Beam #1 having the same directivity as the RX Beam #1 used when the terminal device 200 has received the CSI-RS on the CSI-RS resource 1 is designated as the beam to be used for uplink repetition transmission.

Furthermore, the base station device 100 designates ID of the CSI-RS resource 2 (CSI-RS resource ID 2) as uplink Beam #2. With this operation, the TX Beam #2 having the same directivity as the RX Beam #2 used when the terminal device 200 has received the CSI-RS on the CSI-RS resource 2 is designated as a beam to be used for uplink repetition transmission.

(Arrangement Example in Slot)

Next, a signal arrangement example in a slot in a case where the repetition transmission is Intra Slot Repetition in which the repetition is performed in one slot will be described. Here, a case where the signal for performing the repetition transmission is a control signal (for example, PUCCH) will be described.

The base station device 100 preliminarily sets that resources necessary for transmission of the PUCCH can be taken according to the total number of repetitions. For example, in a case where 1 OFDM symbol is necessary for transmission of the control signal and the total number of repetitions is "4", the base station device 100 sets that four OFDM symbols can be taken as resources of the PUCCH in 1 slot. This makes it possible for the base station device 100 to set to which beam the preset 4OFDM symbol is to be allocated according to the quality (reliability) of the beam.

An arrangement example of control signals in repetition transmission will be described with reference to FIGS. 12A, 12B, 12C, 12D, 12E, 13A, 13B, 13C, 13D, and 13E. FIGS. 12A, 12B, 12C, 12D, 12E, 13A, 13B, 13C, 13D, and 13E are diagrams illustrating an arrangement example of control signals in repetition transmission according to the embodiment of the present disclosure.

Note that FIGS. 12A, 12B, 12C, 12D, and 12E illustrate a case where repetition transmission is performed using a plurality of beams in time division. FIGS. 13A, 13B, 13C, 13D, and 13E illustrate a case where repetition transmission is performed using a plurality of beams simultaneously. In FIGS. 12A, 12B, 12C, 12D, 12E, 13A, 13B, 13C, 13D, and 13E, 1 OFDM symbol is represented by one quadrilateral. In addition, it is assumed that the same PUCCH is transmitted in the OFDM symbol illustrated in the figure. In addition, a number in a quadrilateral represents an index of an OFDM symbol.

For example, the base station device 100 sets that the OFDM symbol of the total number of repetitions can be taken as the resource of the PUCCH from the end of the slot. In the examples of FIGS. 12A, 12B, 12C, 12D, 12E, 13A, 13B, 13C, 13D, and 13E, the base station device 100 allocates each beam to the OFDM symbols #10 to #13 as resources to be used for the repetition transmission of the PUCCH.

For example, in FIG. 12A, the base station device 100 sets the number of repetitions of Beam #1 to "4" and the number of repetitions of Beam #2 to "0". In this case, the base station device 100 allocates the OFDM symbols #10 to #13 to Beam #1. The base station device 100 performs setting so as to transmit the PUCCH in each of the OFDM symbols #10 to #13 using Beam #1.

In addition, in FIG. 12B, the base station device 100 sets the number of repetitions of Beam #1 to "3" and the number of repetitions of Beam #2 to "1". In this case, the base station device 100 allocates the OFDM symbols #10 to #12 to Beam #1 and allocates the OFDM symbol #13 to Beam #2. The base station device 100 performs setting such that the PUCCH is to be transmitted in each of the OFDM symbols #10 to #12 using Beam #1, and the PUCCH is to be transmitted in the OFDM symbol #13 using Beam #2.

In addition, in FIG. 12C, the base station device 100 sets the number of repetitions of Beam #1 to "2" and the number of repetitions of Beam #2 to "2". In this case, the base station device 100 allocates the OFDM symbols #10 and #11 to Beam #1 and allocates the OFDM symbols #12 and #13 to Beam #2. The base station device 100 performs setting such that the PUCCH is to be transmitted in each of the OFDM symbols #10 and #11 using Beam #1, and the PUCCH is to be transmitted in each of the OFDM symbols #12 and #13 using Beam #2.

In addition, in FIG. 12D, the base station device 100 sets the number of repetitions of Beam #1 to "1" and the number of repetitions of Beam #2 to "3". In this case, the base station device 100 allocates the OFDM symbol #10 to Beam #1 and allocates the OFDM symbols #11 to #13 to Beam #2. The base station device 100 performs setting such that the PUCCH is to be transmitted in the OFDM symbol #10 by using Beam #1, and the PUCCH is to be transmitted in each of the OFDM symbols #11 to #13 by using Beam #2.

For example, in FIG. 12E, the base station device 100 sets the number of repetitions of Beam #1 to "0" and the number of repetitions of Beam #2 to "4". In this case, the base station device 100 allocates the OFDM symbols #10 to #13 to beam #2. The base station device 100 performs setting so as to transmit the PUCCH in each of the OFDM symbols #10 to #13 using Beam #2.

For example, in FIG. 13A, the base station device 100 sets the number of repetitions of Beam #1 to "4" and the number of repetitions of Beam #2 to "0". In this case, the base station device 100 allocates the OFDM symbols #10 to #13 to Beam #1. The base station device 100 performs setting so as to transmit the PUCCH in each of the OFDM symbols #10 to #13 using Beam #1.

In addition, in FIG. 13B, the base station device 100 sets the number of repetitions of Beam #1 to "3" and the number of repetitions of Beam #2 to "1". In this case, the base station device 100 allocates the OFDM symbols #11 to #13 to Beam #1 and allocates the OFDM symbol #13 to Beam #2. The base station device 100 performs setting such that the PUCCH is to be transmitted in each of the OFDM symbols #11 to #13 using Beam #1, and the PUCCH is to be transmitted in the OFDM symbol #13 using Beam #2.

In addition, in FIG. 13C, the base station device 100 sets the number of repetitions of Beam #1 to "2" and sets the number of repetitions of Beam #2 to "2". In this case, the base station device 100 allocates the OFDM symbols #12 and #13 to Beam #1 and allocates the OFDM symbols #12 and #13 to Beam #2. The base station device 100 performs setting such that the PUCCH is to be transmitted in each of the OFDM symbols #12 and #13 using Beam #1, and the PUCCH is to be transmitted in each of the OFDM symbols #12 and #13 using Beam #2.

In addition, in FIG. 13D, the base station device 100 sets the number of repetitions of Beam #1 to "1" and the number of repetitions of Beam #2 to "3". In this case, the base station device 100 allocates the OFDM symbol #13 to Beam #1 and allocates the OFDM symbols #11 to #13 to Beam #2. The base station device 100 performs setting such that the PUCCH is to be transmitted in the OFDM symbol #13 by using Beam #1, and the PUCCH is to be transmitted in each of the OFDM symbols #11 to #13 by using Beam #2.

For example, in FIG. 13E, the base station device 100 sets the number of repetitions of Beam #1 to "0" and the number of repetitions of Beam #2 to "4". In this case, the base station device 100 allocates the OFDM symbols #10 to #13 to beam #2. The base station device 100 performs setting so as to transmit the PUCCH in each of the OFDM symbols #10 to #13 using Beam #2.

In FIGS. 12B, 12C, and 12D, focusing on Beam #1, the PUCCH to be transmitted in repetition transmission is not arranged in order from the end of the slot, but focusing on both the beams #1 and #2, it can be seen that the PUCCH is arranged in order from the end of the slot.

As described above, in one slot, allocation of each OFDM symbol is performed in the order of downlink communication and uplink communication. In addition, uplink communication includes a PUCCH and a PUSCH, while the PUCCH is allocated to the last OFDM symbol in the 3GPP standard (for example, Release 15). Accordingly, even in a case where the PUCCH is transmitted in repetition transmission, it is possible to achieve consistency with the standard of the 3GPP technical standard Release 15, for example, by arranging a plurality of PUCCHs in order from the end of the slot.

Note that, here, the base station device 100 allocates the PUCCH to the OFDM symbol in order from the end, but the order is not limited thereto. For example, the base station device 100 may sequentially allocate a plurality of OFDM symbols allocated to the uplink of the slot from the top.

In addition, here, the terminal device 200 transmits the PUCCH with one OFDM symbol, but the transmission is not limited thereto. The terminal device 200 may transmit the PUCCH using two or more OFDM symbols. For example, in a case where the terminal device 200 transmits the PUCCH using two OFDM symbols and the total number of repetitions is "4", the base station device 100 sets 2×4=8 OFDM symbols for transmission of the PUCCH.
(Gap at Beam Switching)

Figures 14, 15:
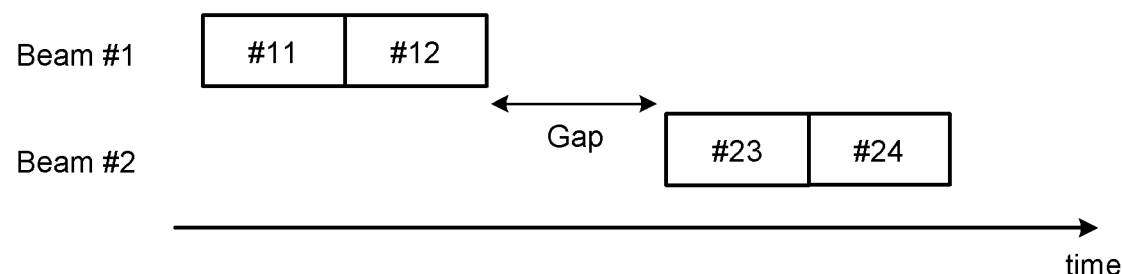
FIG. 14 is a diagram illustrating an example of beam switching by the terminal device according to the embodiment of the present disclosure.
FIG. 15 is a diagram illustrating an example of repetition setting information instructed by the base station device according to the embodiment of the present disclosure.

FIG. 14 is a diagram illustrating an example of beam switching by the terminal device 200 according to the embodiment of the present disclosure.

When switching the beam to be used by the terminal device 200, it may take some time until the beam characteristics are stabilized after the switching. This is because it takes time to stabilize the characteristics of the analog circuit after the beam is switched.

To handle this, when switching the beam to be used for the repetition transmission, the base station device 100 sets a predetermined gap that is a non-transmission section between the preceding and succeeding section of the switching.

In FIG. 14, the base station device 100 sets a gap having a length corresponding to one OFDM symbol at the timing of switching from Beam #1 to Beam #2. Note that FIG. 14 illustrates a case where the numbers of repetitions of the beams #1 and #2 are "2". However, in other cases, for example, in a case where the numbers of repetitions of the beams #1 and #2 are (3, 1) or (1, 3), the gap may be set similarly.

The base station device 100 can set a gap having a length corresponding to, for example, one OFDM symbol, but the length of the gap is not limited thereto.

For example, beam switching includes switching an antenna panel that forms a beam and switching a directivity of a beam without switching an antenna panel.

When the beam is switched by switching the antenna panel, the time until the characteristics are stabilized is longer than that when the antenna panel is not switched. Therefore, in a case where the antenna panel is switched, the base station device 100 sets the gap to be longer than that the case where the antenna panel is not switched. For example, the base station device 100 sets the gap to one OFDM symbol length in the case of beam switching in which the antenna panel is not switched, and sets the gap to two OFDM symbol length in the case of beam switching in which the antenna panel is switched.

The base station device 100 is assumed to acquire information regarding whether to switch the antenna panel for beam switching from the terminal device 200, for example.

4.2. Repetition Across Plurality of Slots

The repetition transmission described above is an intra slot repetition assuming repetition within one slot. However, the repetition transmission also includes an inter slot repetition that transmits a repetition signal across a plurality of slots.

Hereinafter, a case where repetition transmission is performed across a plurality of slots will be described. In order to simplify the description, a case where repetition transmission is performed across two slots will be described below. However, the present technology is similarly applicable to a case where repetition transmission is performed across three or more slots.
(1) Set Collectively for Plurality of Slots First, a case where repetition transmission is collectively set in a plurality of slots will be described. In this case, for example, it is assumed that the setting of the repetition transmission in the first slot and the setting of the repetition transmission in the second slot are associated with each other.
(1-1) Case where Settings are Same in Plurality of Slots As a method in which the terminal device 200 uniquely determines the repetition setting of the second slot from the repetition setting of the first slot, there is a method of using the same repetition setting across the first slot and the second slot.

FIG. 15 is a diagram illustrating an example of repetition setting information instructed by the base station device 100 according to the embodiment of the present disclosure.

The base station device 100 includes information indicating whether to perform repetition transmission using a plurality of beams simultaneously in the repetition setting information. In FIG. 15, simultaneous transmission of different beams is "0", indicating that repetition transmission is performed using beams in time division without performing simultaneous transmission by a plurality of beams. For example, in a case where simultaneous transmission of different beams is to be performed, the base station device 100 sets "simultaneous transmission of different beams" to "1".

The base station device 100 includes the repetition setting of the first slot in the repetition setting information. In FIG. 15, the base station device 100 sets the ratio of the number of times of repetitions (the number of repetitions) of beams #1 and #2 in the first slot as repetition setting. The base station device 100 sets, for example, a set of the number of repetitions of Beams #1 and #2 (the number of repetitions performed in Beam #1 and the number of repetitions performed in Beam #2) as the repetition setting.

The base station device 100 sets the ratio of the number of repetitions of Beams #1 and #2 in the second slot as the repetition setting, and at this time, the base station device 100 sets the same setting as the first slot as the repetition setting.

Note that the base station device 100 does not need to simultaneously notify the terminal device 200 of all the information illustrated in FIG. 15. Each piece of information may be notified to the terminal device 200 at different timings. Furthermore, in a case where it is known in advance that the same repetition setting is to be used in a plurality of slots, the base station device 100 need not explicitly transmit the repetition setting of the second slot. In this case, the terminal device 200 acquires the repetition setting of the second slot by receiving the repetition setting of the first slot.

In this manner, by using the same setting as the repetition setting of the first slot even in the second and subsequent slots, the terminal device 200 can perform repetition transmission in a plurality of slots based on the repetition setting of the first slot.

The base station device 100 can select one of five patterns of repetition transmission. FIG. 16 is a diagram illustrating an example of a pattern of repetition transmission according to the embodiment of the present disclosure.

As described above, the base station device 100 can set one of five patterns of repetition transmission, namely, (4, 0), (3, 1), (2, 2), (1, 3), and (0, 4), as the repetition transmission in one slot.

By using the same repetition setting across a plurality of slots, the base station device 100 can select one pattern from among five patterns in which the same repetition transmission is performed in the first slot and the second slot as illustrated in FIG. 16.

(1-2) Case where Settings are Different Across Plurality of Slots

The terminal device 200 can uniquely acquire the repetition setting of the second slot from the repetition setting of the first slot also by a method of presetting a method of deriving the repetition setting of the second slot from the repetition setting of the first slot.

FIG. 17 is a diagram illustrating another example of the repetition setting information instructed by the base station device 100 according to the embodiment of the present disclosure.

The base station device 100 includes information indicating whether to perform repetition transmission using a plurality of beams simultaneously in the repetition setting information. In FIG. 17, simultaneous transmission of different beams is "0", indicating that repetition transmission is performed using beams in time division without performing simultaneous transmission by a plurality of beams. For example, in a case where simultaneous transmission of different beams is to be performed, the base station device 100 sets "simultaneous transmission of different beams" to "1".

The base station device 100 includes the repetition setting of the first slot in the repetition setting information. In FIG. 17, the base station device 100 sets the ratio of the number of times of repetitions (the number of repetitions) of beams #1 and #2 in the first slot as repetition setting. The base station device 100 sets, for example, a set of the number of repetitions of Beams #1 and #2 (the number of repetitions performed in Beam #1 and the number of repetitions performed in Beam #2) as the repetition setting.

The base station device 100 sets the ratio of the number of repetitions of the beams #1 and #2 in the second slot as repetition setting, and at this time, the base station device 100 sets the settings of the second slots to be uniquely derived from the first slot.

Note that the base station device 100 does not need to simultaneously notify the terminal device 200 of all the information illustrated in FIG. 17. Each piece of information may be notified to the terminal device 200 at different timings. In addition, in a case where a method for uniquely deriving the repetition setting of the second slot from the repetition setting of the first slot is known in advance, the base station device 100 need not explicitly transmit the repetition setting of the second slot. In this case, the terminal device 200 acquires the repetition setting of the second and subsequent slots from the repetition setting of the first slot.

In this manner, by deriving the repetition setting of the second and subsequent slots from the repetition setting of the first slot, the terminal device 200 can perform the repetition transmission across a plurality of slots based on the repetition setting of the first slot.

FIG. 18 is a diagram illustrating another example of the pattern of the repetition transmission according to the embodiment of the present disclosure. FIG. 18 illustrates a case where the repetition setting of the second slot is derived by inverting the repetition setting of the first slot.

In this case, in a case where the repetition transmission in the first slot is set to (4, 0), the base station device 100 sets the repetition transmission in the second slot to (0, 4) (pattern #1). Similarly, in a case where the repetition transmission in the first slot is set to (3, 1), the base station device 100 sets the repetition transmission in the second slot to (1, 3) (pattern #2).

In this manner, the base station device 100 inverts the repetition setting of the first slot to derive the repetition setting of the second slot, making it possible to select one of the five patterns and set the repetition transmission.

(2) Individually Setting for Each of Plurality of Slots

The base station device 100 can individually perform repetition setting for each of a plurality of slots. In this case, the base station device 100 sets repetition transmission for each slot.

FIG. 19 is a diagram illustrating an example of repetition setting information instructed by the base station device 100 according to the embodiment of the present disclosure.

The base station device 100 includes information indicating whether to perform repetition transmission using a plurality of beams simultaneously in the repetition setting information. In FIG. 19, simultaneous transmission of different beams is "0", indicating that repetition transmission is performed using beams in a time division manner without performing simultaneous transmission by a plurality of beams. For example, in a case where simultaneous transmission of different beams is to be performed, the base station device 100 sets "simultaneous transmission of different beams" to "1".

The base station device 100 includes the repetition setting of the first slot in the repetition setting information. In FIG. 19, the base station device 100 sets the ratio of the number of times of repetitions (the number of repetitions) of beams #1 and #2 in the first slot as repetition setting. The base station device 100 sets, for example, a set of the number of repetitions of Beams #1 and #2 (the number of repetitions performed in Beam #1 and the number of repetitions performed in Beam #2) as the repetition setting.

The base station device 100 includes the repetition setting of the second slot in the repetition setting information. In FIG. 19, the base station device 100 sets the ratio of the number of times of repetitions (the number of repetitions) of beams #1 and #2 in the second slot as repetition setting. The base station device 100 sets, for example, a set of the number of repetitions of Beams #1 and #2 (the number of repetitions performed in Beam #1 and the number of repetitions performed in Beam #2) as the repetition setting.

Note that the base station device 100 does not need to simultaneously notify the terminal device 200 of all the information illustrated in FIG. 19. Each piece of information may be notified to the terminal device 200 at different timings.

FIG. 20 is a diagram illustrating an example of a pattern of repetition transmission according to an embodiment of the present disclosure. In FIG. 20, the base station device 100 individually performs repetition setting in the first slot and the second slot.

For example, the base station device 100 sets the repetition transmission in the first slot to (4, 0) and sets the repetition transmission in the second slot to (1, 3) (pattern #1). The base station device 100 sets the repetition transmission in the first slot to (3, 1) and sets the repetition transmission in the second slot to (2, 2) (pattern #2). The base station device 100 sets the repetition transmission in the first slot to (2, 2) and sets the repetition transmission in the second slot to (4, 0) (pattern #3). The base station device 100 sets the repetition transmission in the first slot to (1, 3) and sets the repetition transmission in the second slot to (2, 2) (pattern #4). The base station device 100 sets the repetition transmission in the first slot to (0, 4) and sets the repetition transmission in the second slot to (4, 0) (pattern #5).

In this manner, the base station device 100 individually performs repetition setting in the first slot and the second slot, thereby selecting one pattern among the five patterns and setting the repetition transmission, for example.

Even in a case where the terminal device 200 performs repetition transmission across a plurality of slots, the base station device 100 notifies the terminal device 200 of the repetition setting information, making it possible for the terminal device 200 to perform repetition transmission using a plurality of beams. Furthermore, the base station device 100 can set an appropriate combination of a beam and repetition according to the capability of the terminal device 200 with a higher degree of freedom.

4.3. Repetition Transmission of PUSCH

The repetition transmission described above assumes, for example, the case where the length of the signal to be transmitted is constant like PUCCH. However, for example, even in a case where the length of the signal to be transmitted is variable like PUSCH, it is conceivable to perform repetition transmission for improving reliability and quality.

For example, in a case where repetition transmission is not to be performed, a PUCCH can be transmitted with one OFDM symbol in some cases. On the other hand, a PUSCH may be transmitted using a maximum of 14 OFDM symbols.

In this manner, the number of OFDM symbols used for transmission of the PUCCH, being a control signal, is smaller than the case of the PUSCH being a user data signal.

In contrast, the number of OFDM symbols used for transmission of a PUSCH is larger than the case of the PUCCH. Accordingly, when repetition transmission cannot be simultaneously performed with a plurality of beams, overhead due to beam switching might increase.

Therefore, in order to reduce the overhead of the PUSCH, the base station device 100 restricts the use of the plurality of beams according to the conditions illustrated in Table 2. Table 2 illustrates beam use conditions.

TABLE 2

| Beam Use Conditions | | |
| --- | --- | --- |
| Simultaneous Use of Plurality of Transmission Beams as UE Capability | Use of Plurality of Beams in One Slot | Use of Plurality of Beams in Different Slots |
| Permitted | Permitted | Permitted |
| Not Permitted | Permitted (Conditional) | Permitted |

In a case where simultaneous use of a plurality of transmission beams is possible as the capability of the terminal device 200 (UE), the base station device 100 sets the use of a plurality of beams to "permitted" in either a case of within one slot or a case having different slots.

In a case where simultaneous use of a plurality of transmission beams is not possible as the capability of the terminal device 200 (UE), the base station device 100 sets the use of a plurality of beams to "permitted" in different slots. On the other hand, the base station device 100 sets the use of the plurality of beams within one slot to "permitted" with a condition. As a condition, for example, the base station device 100 sets the use of the beam to "permitted" in a case where beam switching is not frequent.

Further, the reliability of the PUCCH being a control signal is desirably ensured with higher stability than that of the PUSCH being a user data signal. Therefore, the base station device 100 performs repetition setting according to the conditions illustrated in Table 3. Table 3 is a table illustrating the repetition conditions of the PUCCH.

TABLE 3

| Repetition Conditions of PUSCH |
| --- |
| Number of Repetitions of PUSCH ≤ Number of Repetitions of PUCCH |
| Number of Beams of PUSCH ≤ Number of Beams of PUCCH |

For example, the base station device 100 sets the number of repetitions (total number of repetitions) of PUSCH to be equal to or less than the number of repetitions (total number of repetitions) of PUCCH. In addition, the base station device 100 sets the number of beams of PUSCH to be equal to or less than the number of beams of PUCCH.

For example, even when transmitting the PUCCH by repetition transmission using two beams, the base station device 100 sets the number of beams used for the repetition transmission of the PUSCH to one. This makes it possible to ensure higher reliability of the PUCCH.

Furthermore, in the repetition transmission described above, the total number of repetitions is "4". However, for example, in a case where the total number of repetitions of the PUCCH is set to "4", the total number of repetitions of the PUSCH may be "2" or "3", which is smaller than 4.

However, not all OFDM symbols in a slot are allocated for uplink communication, as described above. Therefore, the base station device 100 sets the repetition transmission in accordance with the number of OFDM symbols allocated to the uplink communication.

FIG. 21 is a chart illustrating a setting example of repetition transmission of a PUSCH according to the embodiment of the present disclosure.

As illustrated in FIG. 21, the base station device 100 sets the number of repetitions of the PUSCH in one slot and the number of OFDM symbols to be used in accordance with the number of OFDM symbols allocated to the uplink communication (corresponding to "Uplink OFDM symbol in one slot" in FIG. 21).

For example, the number in the field of "State of repetition of PUSCH in one slot" illustrated in FIG. 21 indicates the number of OFDM symbols used for one transmission of PUSCH. For example, when the "Uplink OFDM symbol in one slot" is "2", the "state of repetition of PUSCH in one slot" is "2". This indicates that the terminal device 200 transmits the PUSCH by using two OFDM symbols, and does not perform repetition.

Furthermore, when the "Uplink OFDM symbol in one slot" is "8", the "state of repetition of the PUSCH in one slot" is "4+4". This indicates that the terminal device 200 transmits the PUSCH by using four OFDM symbols after transmitting the PUSCH by using four OFDM symbols. That is, in this case, the terminal device 200 performs repetition transmission of the PUSCH twice.

In the example illustrated in FIG. 21, the base station device 100 determines not to perform the repetition transmission in a case where the number of OFDM symbols is 7 or less, and determines to perform the repetition of the total number of repetitions of 2 in a case where the number of OFDM symbols is 8 or more.

In the setting illustrated in FIG. 21, the terminal device 200 can perform repetition transmission a maximum of twice, and the same beam may be used in each transmission, or different beams may be used.

FIG. 22 is a chart illustrating an example of a beam used for repetition transmission according to the embodiment of the present disclosure.

FIG. 22 illustrates an example of beam setting performed by the base station device 100 in a case where the terminal device 200 uses different beams in each transmission of the repetition transmission.

For example, the base station device 100 designates the ID of the resource used to transmit the CSI-RS, thereby designating the reception beam and the antenna panel used to receive the CSI-RS on the resource. With this configuration, the terminal device 200 performs the repetition transmission using the transmission beam having the same directivity as the reception beam designated by the base station device 100 and the antenna panel used at the time of reception.

For example, when the terminal device 200 performs repetition transmission a maximum of twice, the base station device 100 designates the ID of the CSI-RS resource 1 (CSI-RS resource ID 1) as the beam to be used in the first transmission (first part). Further, the base station device 100 designates the ID of the CSI-RS resource 2 (CSI-RS resource ID 2) as a beam to be used in the second transmission (second part).

With this configuration, the terminal device 200 performs repetition transmission of the PUSCH using different beams between the first time and the second time.

FIG. 23 is a chart illustrating another example of a beam used for repetition transmission according to the embodiment of the present disclosure.

FIG. 23 illustrates an example of beam setting performed by the base station device 100 in a case where the terminal device 200 uses the same beam in each transmission of the repetition transmission.

For example, when the terminal device 200 performs repetition transmission a maximum of twice, the base station device 100 designates the ID of the CSI-RS resource 1 (CSI-RS resource ID 1) as the beam to be used in the first transmission (first part). Further, the base station device 100 designates the ID of the CSI-RS resource 1 (CSI-RS resource ID 1) as a beam to be used in the second transmission (second part).

With this configuration, the terminal device 200 performs repetition transmission of the PUSCH using the same beam in the first time and the second time transmissions.

Figure 24:
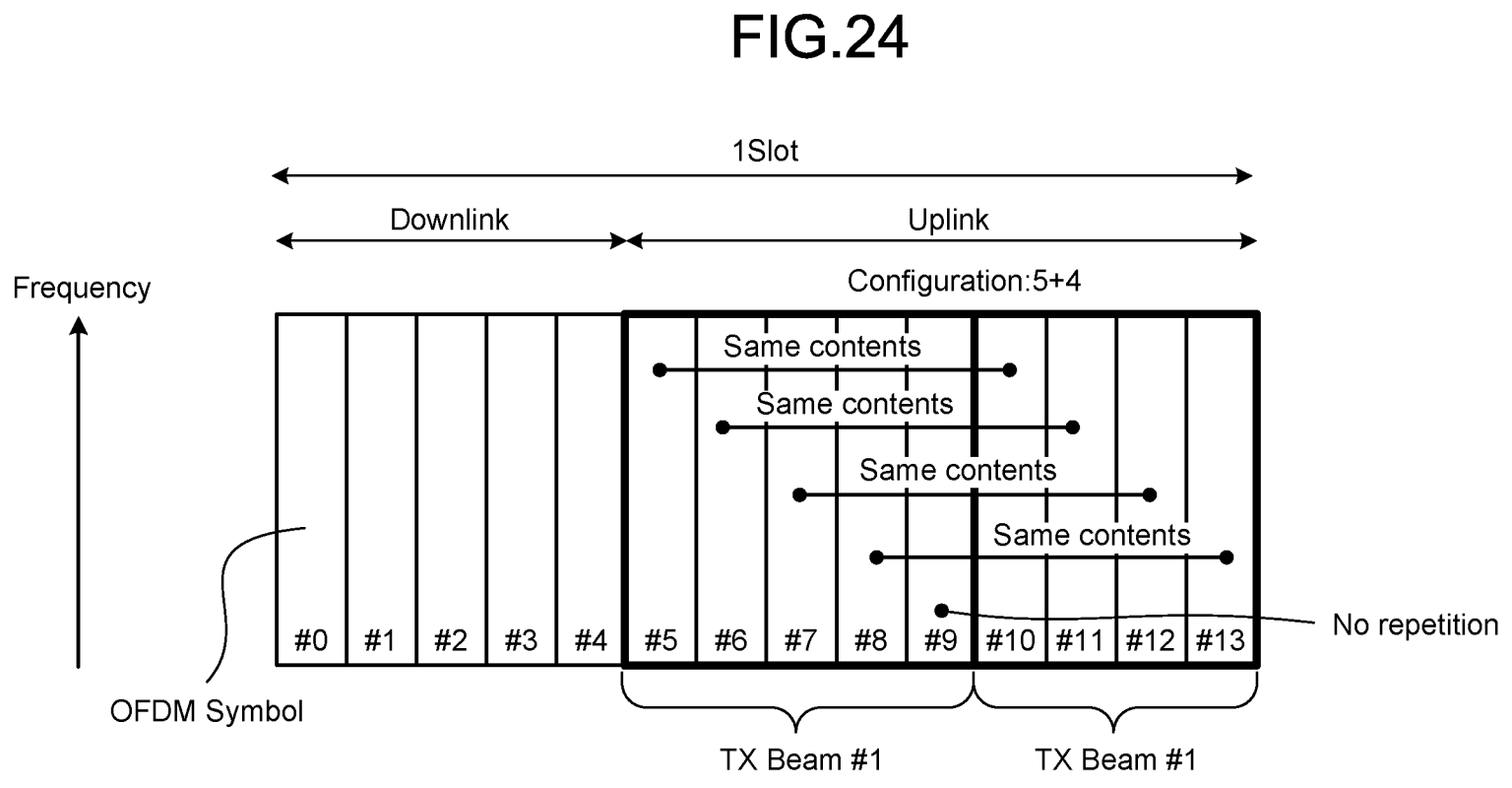

FIG. 24 is a diagram illustrating an example of resource allocation in repetition transmission according to the embodiment of the present disclosure.

FIG. 24 illustrates a case where the number of OFDM symbols allocated to the uplink within one slot is "9", and the base station device 100 selects "5+4" as the repetition setting of the PUSCH.

In this case, the terminal device 200 transmits the PUSCH by using the TX Beam #1 in five OFDM symbols from the head among the OFDM symbols allocated for the uplink, and transmits the PUSCH by using the TX Beam #2 in the subsequent four OFDM symbols.

At this time, the terminal device 200 transmits the same data (content) using the leading OFDM symbol (OFDM symbol #5) of the first transmission and the leading OFDM symbol (OFDM symbol #10) of the second transmission. Similarly, the terminal device 200 transmits the same data in the second to fourth OFDM symbols (OFDM symbols #6 to #8) in the first transmission and the second to fourth OFDM symbols (OFDM symbols #11 to #13) in the second transmission, respectively. The number of OFDM symbols used in the first transmission is larger than the number of OFDM symbols used in the second transmission. Therefore, the terminal device 200 does not perform repetition for the data transmitted by the last OFDM symbol (OFDM symbol #9) of the first transmission.

Although the terminal device 200 performs repetition (second transmission) sequentially from the head of the OFDM symbol to be transmitted for the first time, the order is not limited thereto. The repetition (second transmission) may be performed sequentially from the end of the OFDM symbol transmitted at the first time. That is, data same as the data transmitted by the OFDM symbols #6 to #9 as the first transmission may be transmitted by the terminal device 200 by the OFDM symbols #10 to #13 as the second transmission. Alternatively, the terminal device 200 may perform random repetition of OFDM symbols.

Here, the number of times of repetition transmission performed by the terminal device 200 is set to two at maximum, but is not limited thereto. The terminal device 200 may perform repetition transmission a maximum of three times or more. For example, the base station device 100 sets the maximum total number of repetitions of the terminal device 200 such that the less the data amount of the user data, the larger the total number of repetitions.

FIG. 25 is a chart illustrating a setting example of repetition transmission of PUSCH according to the embodiment of the present disclosure.

The base station device 100 may change the number of repetitions in accordance with the amount of user data to be transmitted in the uplink.

For example, in FIG. 25, the base station device 100 sets the number of repetitions to a maximum of three in a case where the amount of uplink user data is small.

For example, when the "Uplink OFDM Symbol in one slot" is "9", the "state of repetition of the PUSCH in one slot" is "3+3+3". This indicates that the terminal device 200 repeats the transmission of the PUSCH using three OFDM symbols three times.

In the example illustrated in FIG. 25, the base station device 100 determines not to perform the repetition transmission in a case where the number of OFDM symbols is 1 or less, and determines to perform the repetition of the total number of repetitions of 2 in a case where the number of OFDM symbols is 2 or more and 7 or less. In addition, the base station device 100 determines to repeat the total number of repetitions of 3 in a case where the number of OFDM symbols is 8 or more. In this manner, the base station device 100 determines the number of times of repetition transmission in accordance with the number of OFDM symbols.

In the setting illustrated in FIG. 25, the terminal device 200 can perform repetition transmission a maximum of three times, and the same beam may be used in each transmission, or different beams may be used.

FIG. 26 is a chart illustrating an example of a beam used for repetition transmission according to an embodiment of the present disclosure.

FIG. 26 illustrates an example of beam setting performed by the base station device 100 in a case where the terminal device 200 uses completely different beams in each transmission of the repetition transmission.

As described above, the base station device 100 designates the ID of the resource used to transmit the CSI-RS, for example, thereby designating the reception beam and the antenna panel used to receive the CSI-RS on the resource. With this configuration, the terminal device 200 performs the repetition transmission using the transmission beam having the same directivity as the reception beam designated by the base station device 100 and the antenna panel used at the time of reception.

For example, when the terminal device 200 performs repetition transmission a maximum of three times, the base station device 100 designates the ID of the CSI-RS resource 1 (CSI-RS resource ID 1) as the beam to be used in the first transmission (first part). Further, the base station device 100 designates the ID of the CSI-RS resource 2 (CSI-RS resource ID 2) as a beam to be used in the second transmission (second part). The base station device 100 designates the ID of the CSI-RS resource 3 (CSI-RS resource ID 3) as the beam to be used in the third transmission (third part).

With this configuration, the terminal device 200 performs repetition transmission of the PUSCH using completely different beams in each of the first to third transmissions.

FIG. 27 is a chart illustrating another example of a beam used for repetition transmission according to an embodiment of the present disclosure.

FIG. 27 illustrates a beam setting example performed by the base station device 100 in a case where the same beam is used for the first and second transmissions while different beams are used for the third transmission among three times of transmissions.

For example, when the terminal device 200 performs repetition transmission a maximum of three times, the base station device 100 designates the ID of the CSI-RS resource 1 (CSI-RS resource ID 1) as the beam to be used in the first transmission (first part). Further, the base station device 100 designates the ID of the CSI-RS resource 1 (CSI-RS resource ID 1) as a beam to be used in the second transmission (second part). The base station device 100 designates the ID of the CSI-RS resource 2 (CSI-RS resource ID 2) as the beam to be used in the third transmission (third part).

With this configuration, the terminal device 200 performs repetition transmission of the PUSCH by using the same beam in the first and second times and using the switched beam in the third time.

In this manner, the number beams Nb used when the total number Nr of repetitions is n (n>2) times may be smaller than the total number Nr of repetitions (Nr>Nb).

Figure 28:
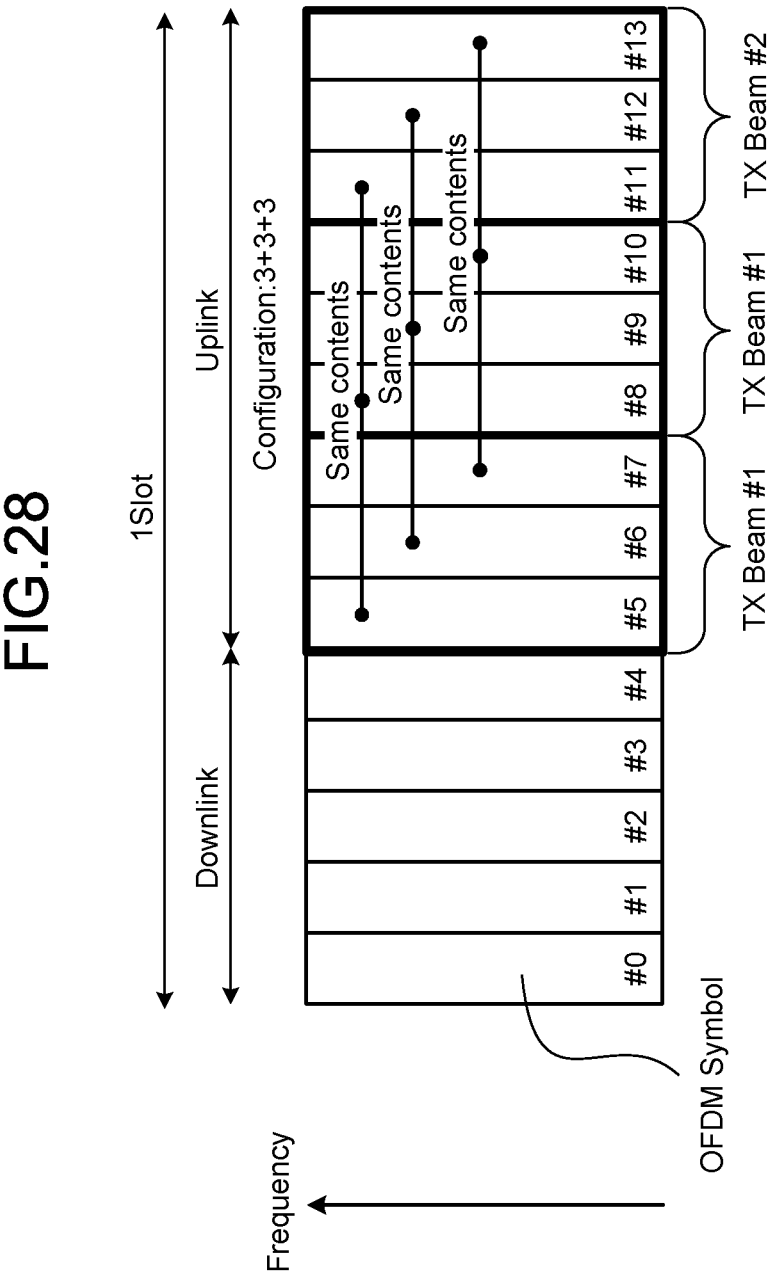
FIG. 28 is a diagram illustrating an example of resource allocation in repetition transmission according to the embodiment of the present disclosure.

FIG. 28 is a diagram illustrating an example of resource allocation in repetition transmission according to the embodiment of the present disclosure.

FIG. 28 illustrates a case where the number of OFDM symbols allocated to the uplink within one slot is "9", and the base station device 100 selects "3+3+3" as the repetition setting of the PUSCH.

In this case, the terminal device 200 transmits the PUSCH by using the TX Beam #1 in three OFDM symbols from the head among the OFDM symbols allocated for the uplink, and transmits the PUSCH by using the TX Beam #1 in the subsequent three OFDM symbols. Furthermore, the terminal device 200 transmits the PUSCH by using the TX Beam #2 in three OFDM symbols.

At this time, the terminal device 200 transmits the same data (content) in the leading OFDM symbols (OFDM symbols #5, #8, and #11) of the first to third transmissions. Similarly, the terminal device 200 transmits the same data in the second OFDM symbol (OFDM symbols #6, #9, and #12) of the first to third transmissions. The terminal device 200 transmits the same data in the third OFDM symbol (OFDM symbols #7, #10, and #13) of the first to third transmissions.

Note that, in a case where the number of OFDM symbols used in the third transmission is smaller than the number of OFDM symbols used in the first and second transmissions, the terminal device 200 does not perform repetition for some data.

4.4. Other Technical Features

The repetition transmission of the PUSCH described above is repetition transmission within one slot. In addition, the PUSCH can also be transmitted with repetition transmission across a plurality of slots. In this case, similarly to the <4.2. Repetition across plurality of slots>, the base station device 100 performs repetition setting of the PUSCH collectively or individually in a plurality of slots. With this configuration, even in a case of performing repetition transmission of data in which the number of OFDM symbols allocated to one slot is variable, such as a PUSCH, the terminal device 200 can perform repetition transmission across a plurality of slots.

Furthermore, in a case where the terminal device 200 has not received the repetition setting information notified by the base station device 100, the terminal device 200 performs uplink repetition transmission based on preset information.

In this case, for example, the terminal device 200 uses a beam according to indexes of a plurality of CORESETs for repetition transmission. For example, when the terminal device 200 uses two beams for repetition transmission, the repetition transmission is performed using beams designated by the smallest and largest indexes of the plurality of CORESETs.

Alternatively, the terminal device 200 may perform uplink repetition transmission based on repetition setting information designated in advance.

With this configuration, the terminal device 200 can perform uplink repetition transmission even when the repetition setting information cannot be acquired from the base station device 100.

5. Modification

The terminal device or the base station device in the present embodiment may be implemented by a dedicated computer system or a general-purpose computer system.

For example, a communication program for executing the above-described operations is stored in a computer-readable recording medium such as an optical disk, semiconductor memory, a magnetic tape, or a flexible disk and distributed. For example, the program is installed on a computer and the above processing is executed to achieve the configuration of the control device. At this time, the control device may be the terminal device 200, the base station device 100, or other external devices (for example, a personal computer). Furthermore, the control device may be a device (for example, each control unit) inside the terminal device 200 or the base station device 100.

Furthermore, the communication program may be stored in a disk device included in a server device on a network such as the Internet so as to be able to be downloaded to a computer, for example. Furthermore, the functions described above may be implemented by using operating system (OS) and application software in cooperation. In this case, the sections other than the OS may be stored in a medium for distribution, or the sections other than the OS may be stored in a server device so as to be downloaded to a computer, for example.

Furthermore, among each process described in the above embodiments, all or a part of the processes described as being performed automatically may be manually performed, or the processes described as being performed manually can be performed automatically by a known method. In addition, the processing procedures, specific names, and information including various data and parameters illustrated in the above Literatures or drawings can be arbitrarily altered unless otherwise specified. For example, various types of information illustrated in each of the drawings are not limited to the information illustrated.

In addition, each of components of each device is provided as a functional and conceptual illustration and thus does not necessarily need to be physically configured as illustrated. That is, the specific form of distribution/integration of each device is not limited to those illustrated in the drawings, and all or a part thereof may be functionally or physically distributed or integrated into arbitrary units according to various loads and use conditions.

Furthermore, the above-described individual embodiments can be appropriately combined within a range implementable without contradiction of processes.

6. Summary

The preferred embodiments of the present disclosure have been described in detail above with reference to the accompanying drawings. However, the technical scope of the present disclosure is not limited to such examples. It will be apparent to those skilled in the art of the present disclosure that various modifications and alterations can be conceived within the scope of the technical idea described in the claims and naturally fall within the technical scope of the present disclosure.

Furthermore, the effects described in the present specification are merely illustrative or exemplary and are not limited. That is, the technology according to the present disclosure can exhibit other effects that are apparent to those skilled in the art from the description of the present specification in addition to or instead of the above effects.

Note that the following configurations also belong to the technical scope of the present disclosure.

(1)

A base station device, the device configured to perform operation of transmitting, to a terminal device, repetition information instructing repetition transmission of a signal in an uplink and beam information instructing a beam to be used in the repetition transmission in association with each other.

(2)

The base station device according to (1), the device configured to further perform operation of transmitting setting information including the repetition information and the beam information to the terminal device.

(3)

The base station device according to (1) or (2), wherein the signal to be transmitted in the repetition transmission is a control signal in the uplink.

(4)

The base station device according to any one of (1) to (3), wherein the signal to be transmitted in the repetition transmission is a user data signal in the uplink.

(5)

The base station device according to any one of (1) to (4), the device configured to further perform operation of transmitting information indicating whether to simultaneously transmit the signal by a plurality of the beams or transmitting the signal at different timings for the plurality of beams in accordance with a capability of the terminal device regarding beam transmission.

(6)

The base station device according to any one of (1) to (5), wherein a plurality of repetition signals which is obtained by repeating the signal and is transmitted by the beam, being a different beam, is transmitted across a predetermined gap.

(7)

The base station device according to any one of (1) to (6), the device configured to further perform operation of transmitting the repetition information and the beam information so as to achieve repetition transmission of the signal in one slot.

(8)

The base station device according to any one of (1) to (6), the device configured to further perform operation of transmitting, when performing repetition transmission of the signal in a plurality of slots, application information indicating that the repetition information to be applied to at least one of the plurality of slots is to be used to derive the repetition information to be applied to at least one of remaining slots.

(9)

The base station device according to any one of (1) to (6), the device configured to further perform operation of transmitting, when performing repetition transmission of the signal in a plurality of slots, application information indicating that the repetition information to be applied to at least one of the plurality of slots is to be applied to at least one of remaining slots.

(10)

The base station device according to any one of (1) to (6), the device configured to further perform operation of transmitting, when the signal is to be transmitted in repetition transmission in a plurality of slots, application information indicating that the repetition information to be applied to each of the slots is to be individually transmitted.

(11)

The base station device according to any one of (1) to (10), the device configured to further perform operation of determining to perform the repetition transmission when the number of symbols allocated to the uplink slot for transmission of the signal is a predetermined threshold or more.

(12)

The base station device according to (11), the device configured to further perform operation of determining number of repetitions of the signal in accordance with the number of symbols.

(13)

The base station device according to (12), the device configured to further perform, when the number of repetitions is two or more, operation of transmitting the beam information indicating that the repetition transmission is to be performed by using the beam, being a different beam.

(14)

The base station device according to (11) or (12), the device configured to further perform, when the number of repetitions is three or more, operation of transmitting the beam information indicating that the number of beams to be used for the repetition transmission is smaller than the number of repetitions.

(15)

A terminal device, the device configured to perform operations comprising:

receiving repetition information indicating repetition transmission of a signal in an uplink, and beam information that is associated with the repetition information and that indicates a beam to be used for the repetition transmission; and performing the repetition transmission of the signal by using the beam based on the repetition information and the beam information.

(16)

The terminal device according to (15), wherein, when the device is to perform the repetition transmission in a case where the device has not received the repetition information or the beam information, the device performs the repetition transmission based on preset repetition setting information.

(17)

The terminal device according to (15), wherein when the device is to perform the repetition transmission in a case where the device has not received the repetition information or the beam information, the device performs the repetition transmission using the beam according to indexes of a plurality of CORESETs.

(18)

A communication system comprising:

a base station device that transmits repetition information instructing repetition transmission of a signal in an uplink and beam information instructing a beam to be used for the repetition transmission in association with each other; and a terminal device that receives the repetition information and the beam information, and performs the repetition transmission of the signal by using the beam based on the received repetition information and the beam information.

(19)

A communication method comprising processing of transmitting, to a terminal device, repetition information instructing repetition transmission of a signal in an uplink and beam information instructing a beam to be used in the repetition transmission in association with each other.

(20)

A communication method comprising:

receiving repetition information indicating repetition transmission of a signal in an uplink, and beam information that is associated with the repetition information and that indicates a beam to be used for the repetition transmission; and performing the repetition transmission of the signal by using the beam based on the repetition information and the beam information.

REFERENCE SIGNS LIST

1 COMMUNICATION SYSTEM
20 CORE NETWORK
30 PDN
100 BASE STATION DEVICE
200 TERMINAL DEVICE
110, 210 ANTENNA UNIT
120, 220 RADIO COMMUNICATION UNIT
130 NETWORK COMMUNICATION UNIT
140, 230 STORAGE UNIT
150, 240 CONTROL UNIT
151 SETTING UNIT
152 NOTIFICATION UNIT
241 SETTING UNIT
242 REPETITION PROCESSING UNIT

The invention claimed is:

1. A base station device, comprising:

circuitry configured to:

transmit, to a terminal device, repetition setting information, wherein the repetition setting information includes repetition information that indicates repetition transmission of a signal in an uplink, and beam information that indicates a plurality of beams, the repetition information is associated with the beam information, the plurality of beams includes a first beam, and a second beam different from the first beam, and the repetition setting information further includes a ratio of a number of repetitions of the signal in the first beam and a number of repetitions of the signal in the second beam; and control the terminal device to perform the repetition transmission of the signal in a plurality of slots, wherein the repetition transmission of the signal is in each of the first beam and the second beam, and the repetition transmission of the signal is based on the repetition setting information.

2. The base station device according to claim 1, wherein the signal is a control signal in the uplink.

3. The base station device according to claim 1, wherein the signal is a user data signal in the uplink.

4. The base station device according to claim 1, wherein the circuitry is further configured to transmit specific information to the terminal device, the specific information indicates one of simultaneous transmission of the signal in the plurality of beams or transmission of the signal at different timings in the plurality of beams, the specific information is based on a capability of the terminal device regarding beam transmission.

5. The base station device according to claim 1, wherein the circuitry is further configured to:

generate a plurality of repetition signals based on the repetition transmission of the signal; and transmit, after a specific gap, the plurality of repetition signals in in a third beam of the plurality of beams, wherein the third beam is different from the first beam and the second beam.

6. The base station device according to claim 1, wherein the circuitry is further configured to transmit each of the repetition information and the beam information such that the repetition transmission of the signal is in one slot of the plurality of slots.

7. The base station device according to claim 1, wherein the plurality of slots includes a first slot and a set of slots, the repetition information further includes first repetition information, and second repetition information different from the first repetition information, the circuitry is further configured to:

apply the first repetition information to the first slot;

apply the second repetition information to at least one of the set of slots; and transmit application information to the terminal device, and the application information indicates that the first repetition information is for derivation of the second repetition information.

8. The base station device according to claim 1, wherein the plurality of slots includes a first slot and a set of slots, the circuitry is further configured to:

apply the repetition information to the first slot and at least one of the set of slots; and transmit application information to the terminal device, and the application information indicates the application of the repetition information to the at least one of the set of slots.

9. The base station device according to claim 1, wherein the circuitry is further configured to:

apply the repetition information to each of the plurality of slots; and transmit application information to the terminal device, and the application information indicates individual transmission of the applied repetition information.

10. The base station device according to claim 1, wherein the circuitry is further configured to:

determine that a number of symbols allocated to the uplink is equal to or greater than a threshold value; and control the terminal device to perform the repetition transmission based on the determination that the number of symbols is equal to or greater than the threshold value.

11. The base station device according to claim 10, wherein the circuitry is further configured to determine, based on the number of symbols, the number of repetitions of the signal in the first beam.

12. The base station device according to claim 11, wherein the circuitry is further configured to:

determine that the number of repetitions of the signal in the first beam is equal to or greater than two; and transmit the beam information based on the determination that the number of repetitions in the first beam is equal to or greater than two, wherein the beam information indicates that the repetition transmission is to be performed in the second beam.

13. The base station device according to claim 10, wherein the circuitry is further configured to:

determine that the number of repetitions of the signal in the first beam is at least equal to or greater than three; and transmit the beam information based on the determination that the number of repetitions of the signal in the first beam is at least equal to or greater than three, wherein the beam information indicates that a number of the plurality of beams associated with the repetition transmission is less than the number of repetitions of the signal in the first beam.

14. A terminal device, comprising:

circuitry configured to:

receive repetition setting information, wherein the repetition setting information includes repetition information that indicates repetition transmission of a signal in an uplink, and beam information that is associated with the repetition information, the beam information indicates a plurality of beams, the plurality of beams includes a first beam, and a second beam different from the first beam, and the repetition setting information further includes a ratio of a number of repetitions of the signal in the first beam and a number of repetitions of the signal in the second beam; and perform the repetition transmission of the signal in a plurality of slots based on the repetition setting information, wherein the repetition transmission of the signal is in each of the first beam and the second beam.

15. The terminal device according to claim 14, wherein the circuitry is further configured to;

detect an absence of at least one of the repetition information or the beam information; and perform the repetition transmission based on the detection of the absence of the at least one of the repetition information or the beam information.

16. The terminal device according to claim 14, wherein the circuitry is further configured to:

detect an absence of at least one of the repetition information or the beam information; and perform, based on indexes of a plurality of CORESETs, the repetition transmission of a signal in a third beam of the plurality of beams.

17. A communication system, comprising:

a base station device that is configured to:

transmit repetition setting information, wherein the repetition setting information includes repetition information that indicates repetition transmission of a signal in an uplink, and beam information that indicates a plurality of beams associated with the repetition transmission, the repetition information is associated with the beam information, the plurality of beams includes a first beam, and a second beam different from the first beam, and the repetition setting information further includes a ratio of a number of repetitions of the signal in the first beam and a number of repetitions of the signal in the second beam; and a terminal device that is configured to:

receive the repetition setting information; and perform the repetition transmission of the signal in a plurality of slots based on the received repetition setting information, wherein the repetition transmission of the signal is in each of the first beam and the second beam.

18. A communication method, comprising:

in a base station device:

transmitting, to a terminal device, repetition setting information, wherein the repetition setting information includes repetition information that indicates repetition transmission of a signal in an uplink, and beam information that indicates a plurality of beams, the repetition information is associated with the beam information, the plurality of beams includes a first beam, and a second beam different from the first beam, and the repetition setting information further includes a ratio of a number of repetitions of the signal in the first beam and a number of repetitions of the signal in the second beam; and controlling the terminal device to perform the repetition transmission of the signal in a plurality of slots, wherein the repetition transmission of the signal is based on the repetition setting information, and the repetition transmission of the signal is in each of the first beam and the second beam.

19. A communication method, comprising:

in a terminal device:

receiving repetition setting information, wherein the repetition setting information includes repetition information that indicates repetition transmission of a signal in an uplink, and beam information that is associated with the repetition information, the beam information indicates a plurality of beams, the plurality of beams includes a first beam, and a second beam different from the first beam, and the repetition setting information further includes a ratio of a number of repetitions of the signal in the first beam and a number of repetitions of the signal in the second beam; and performing the repetition transmission of the signal in a plurality of slots based on the repetition setting information, wherein the repetition transmission of the signal is in each of the first beam and the second beam.

* * * * *